Feb. 14, 1928.
A. E. HOPKINS
1,659,143
ARTICLE WRAPPING MACHINERY
Filed June 2, 1924   19 Sheets-Sheet 4
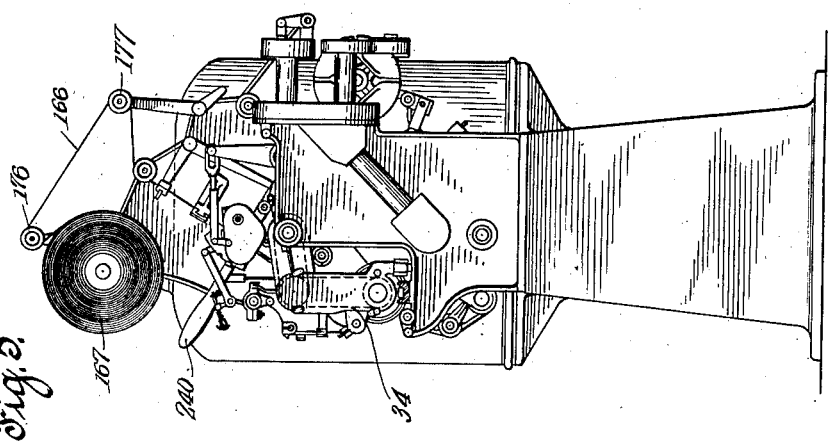
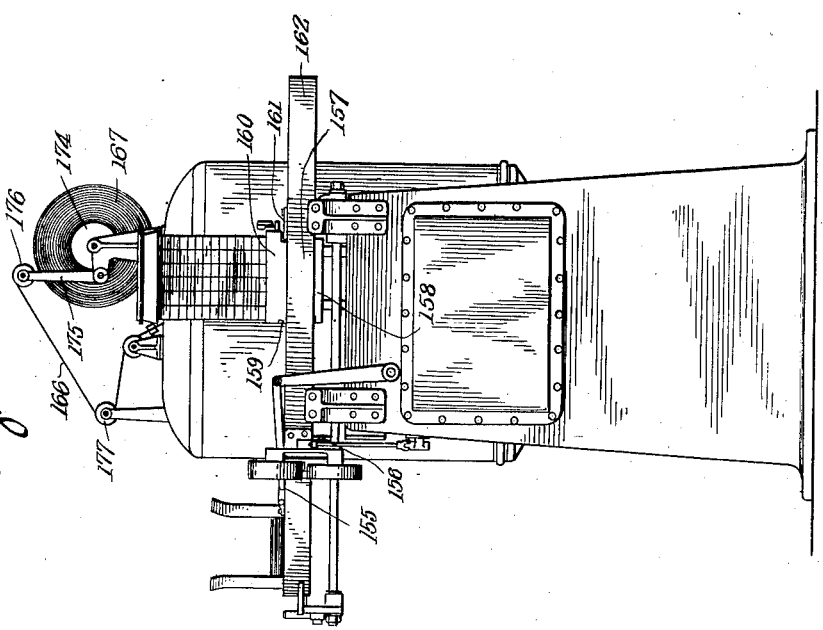
INVENTOR
A. E. Hopkins
BY
Philip S. McLean
ATTORNEY

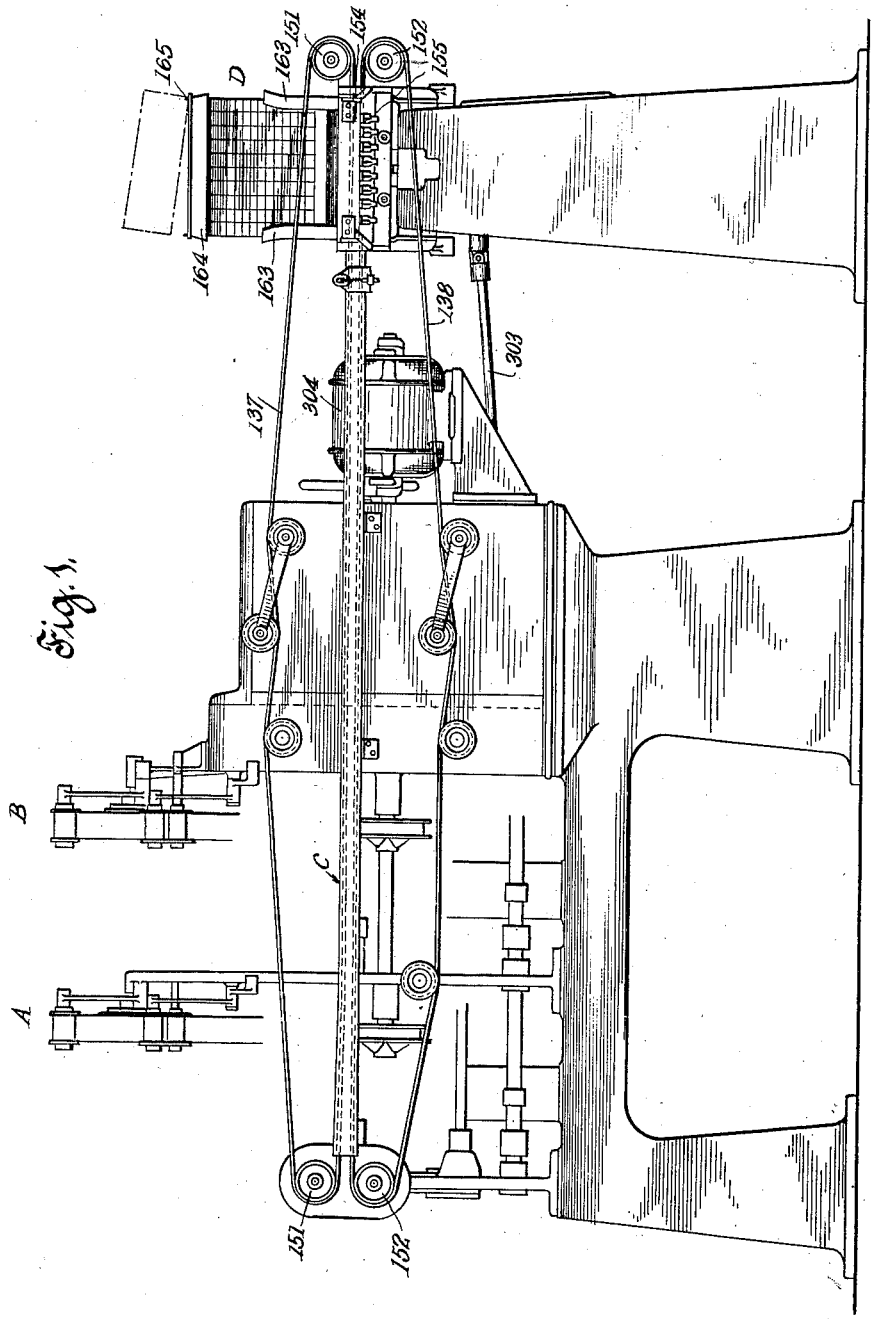

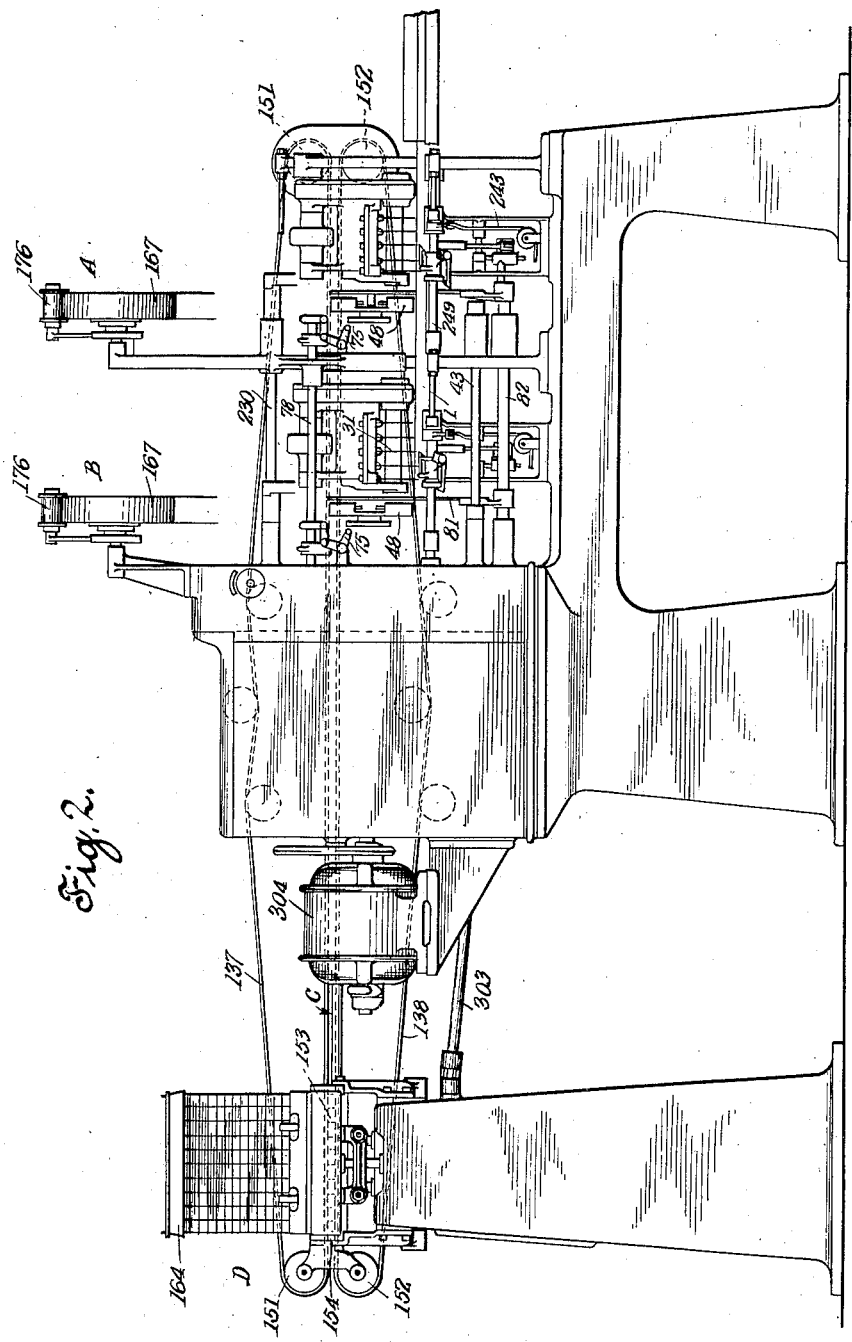

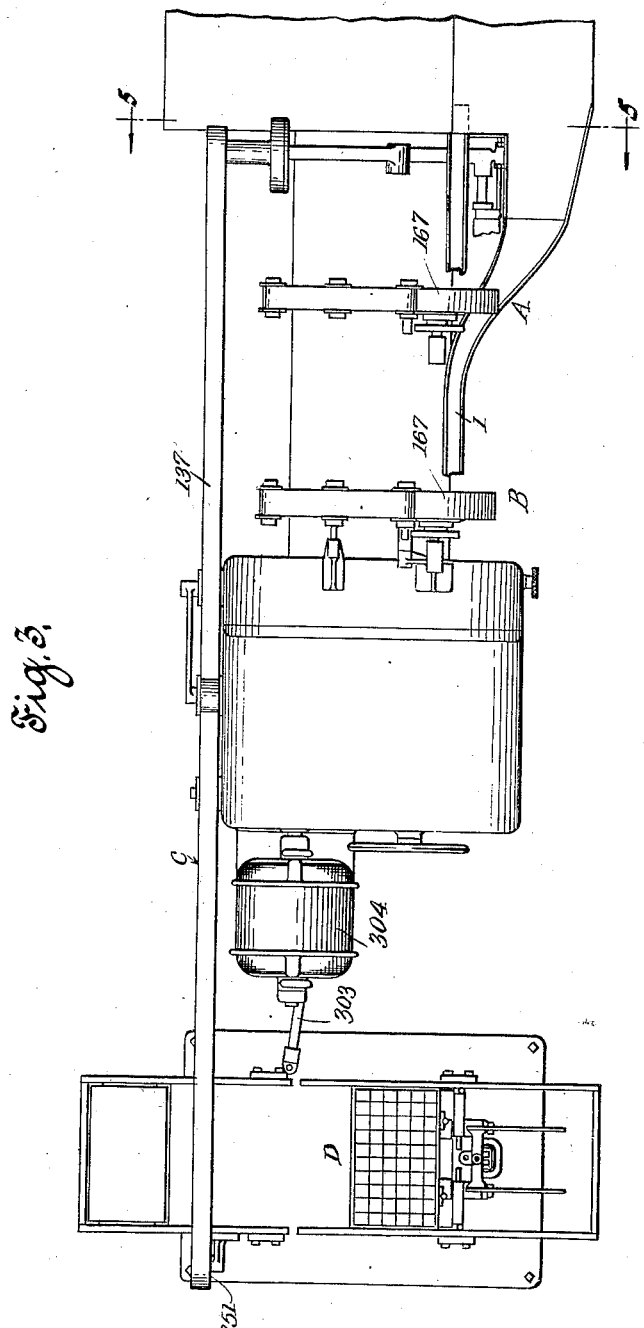

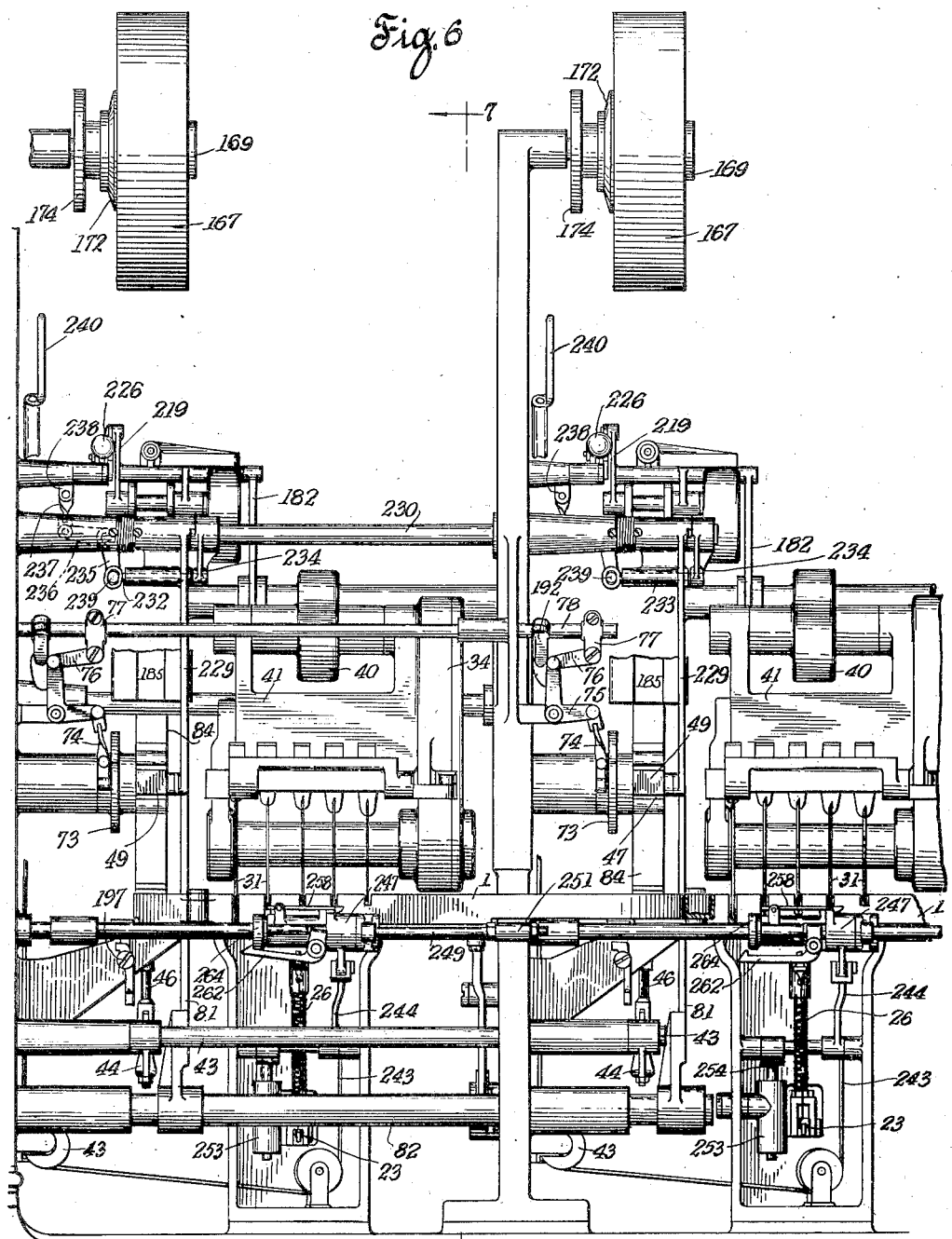

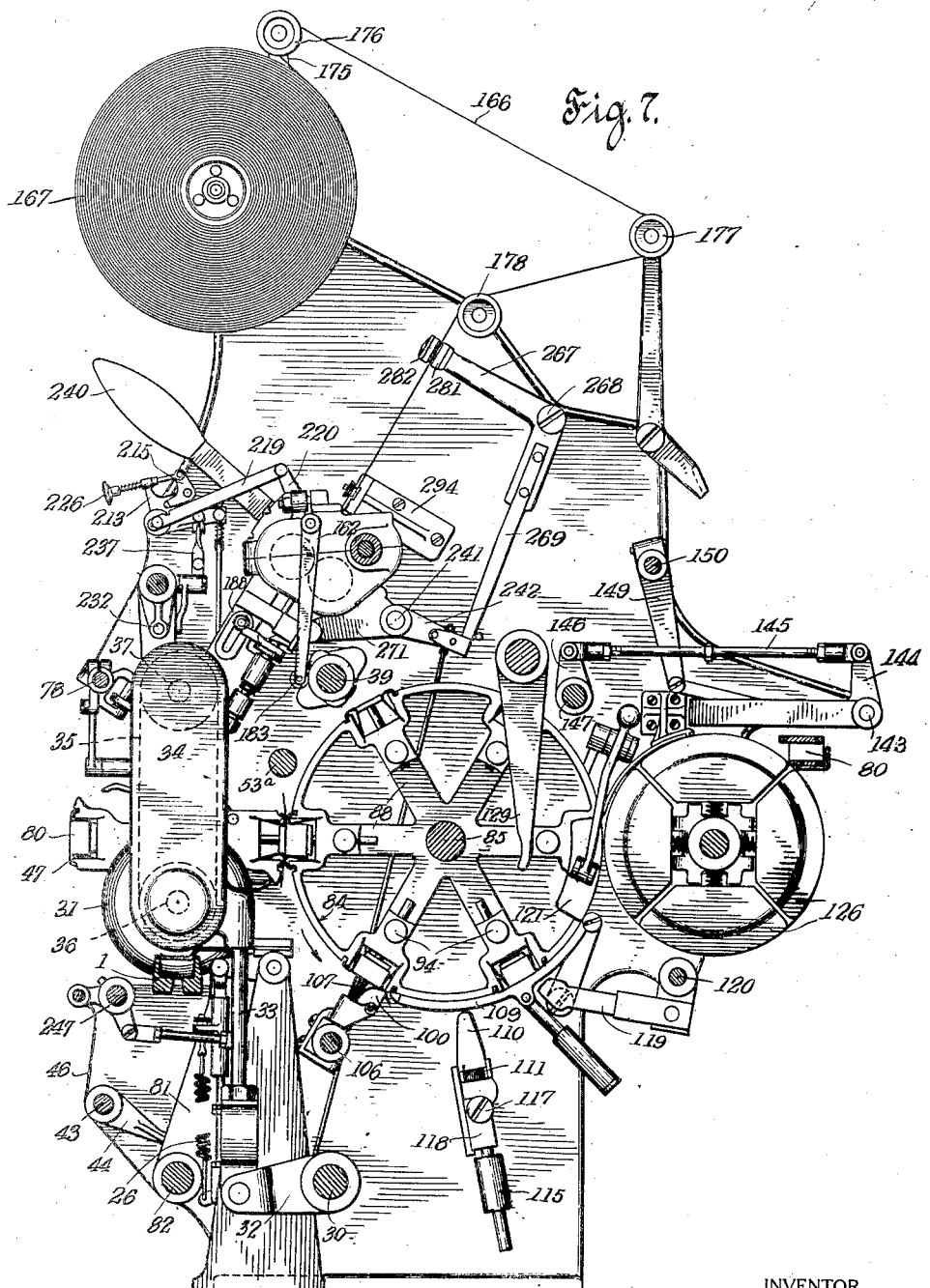

Feb. 14, 1928.

A. E. HOPKINS 1,659,143

ARTICLE WRAPPING MACHINERY

Filed June 2, 1924    19 Sheets-Sheet 7

INVENTOR
A. E. Hopkins
BY Philip S. McLean
ATTORNEY

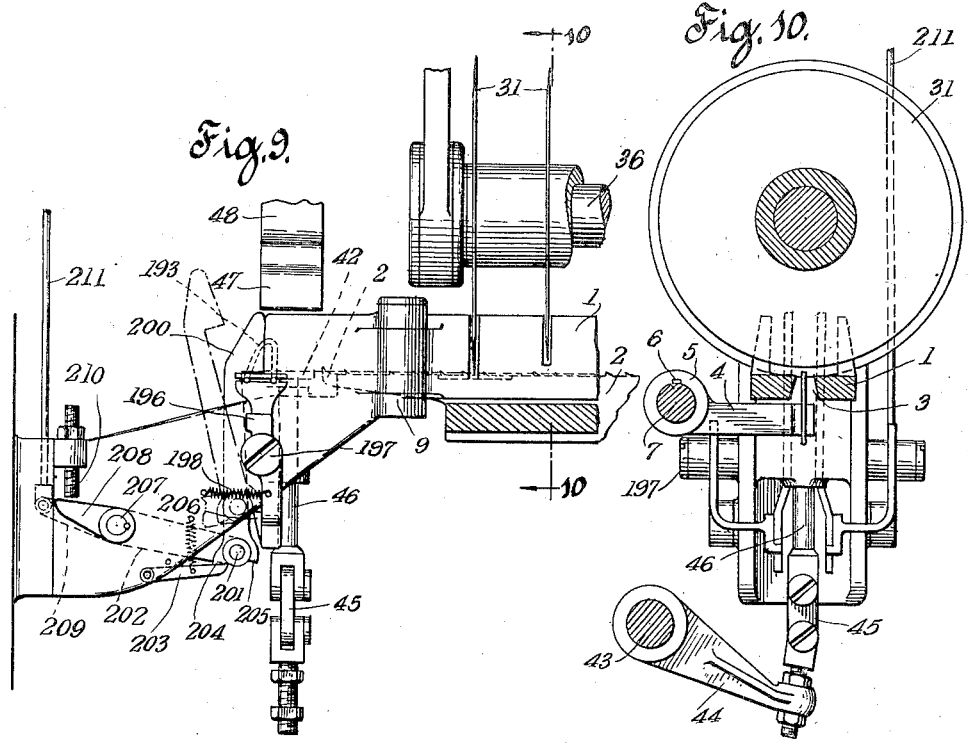

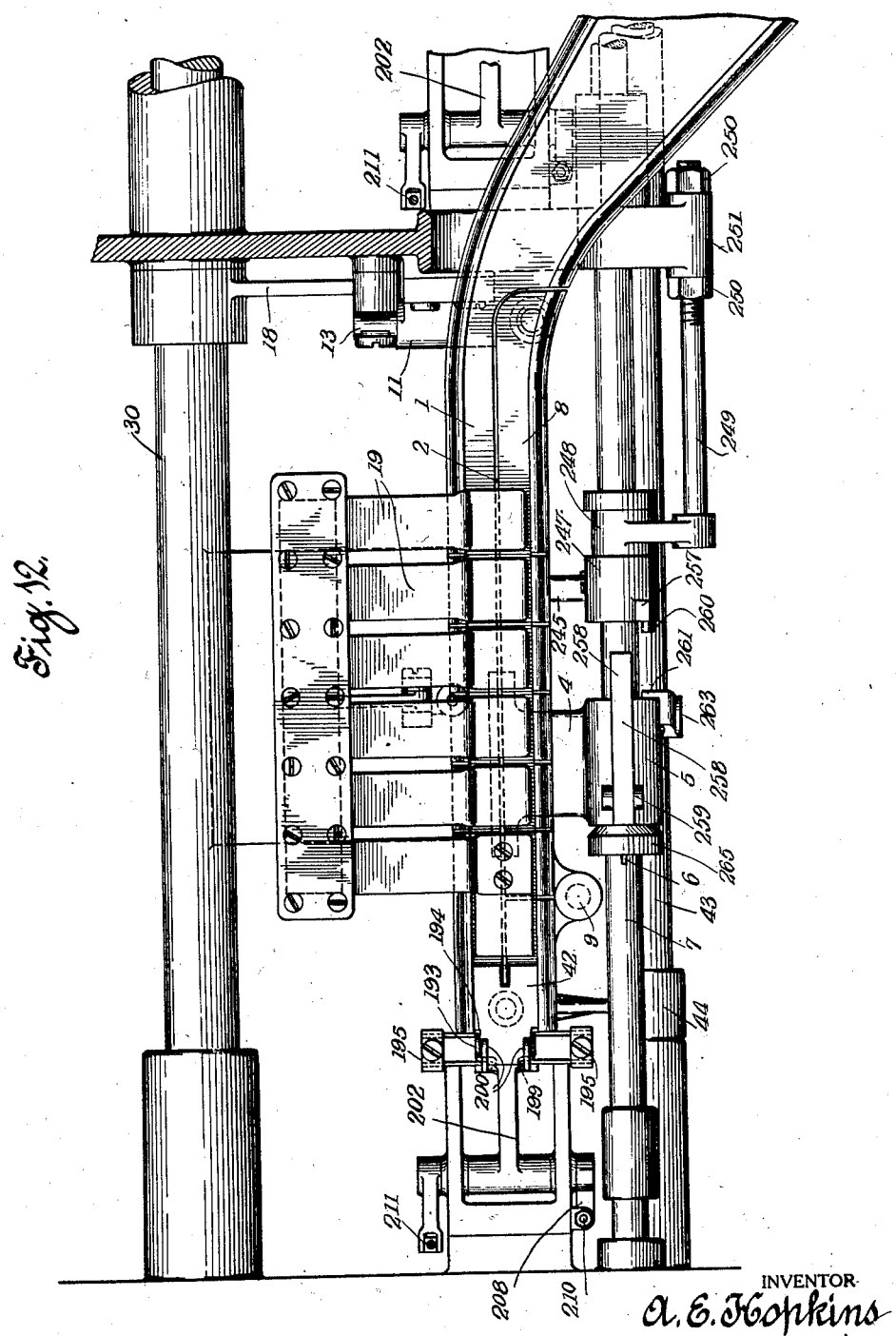

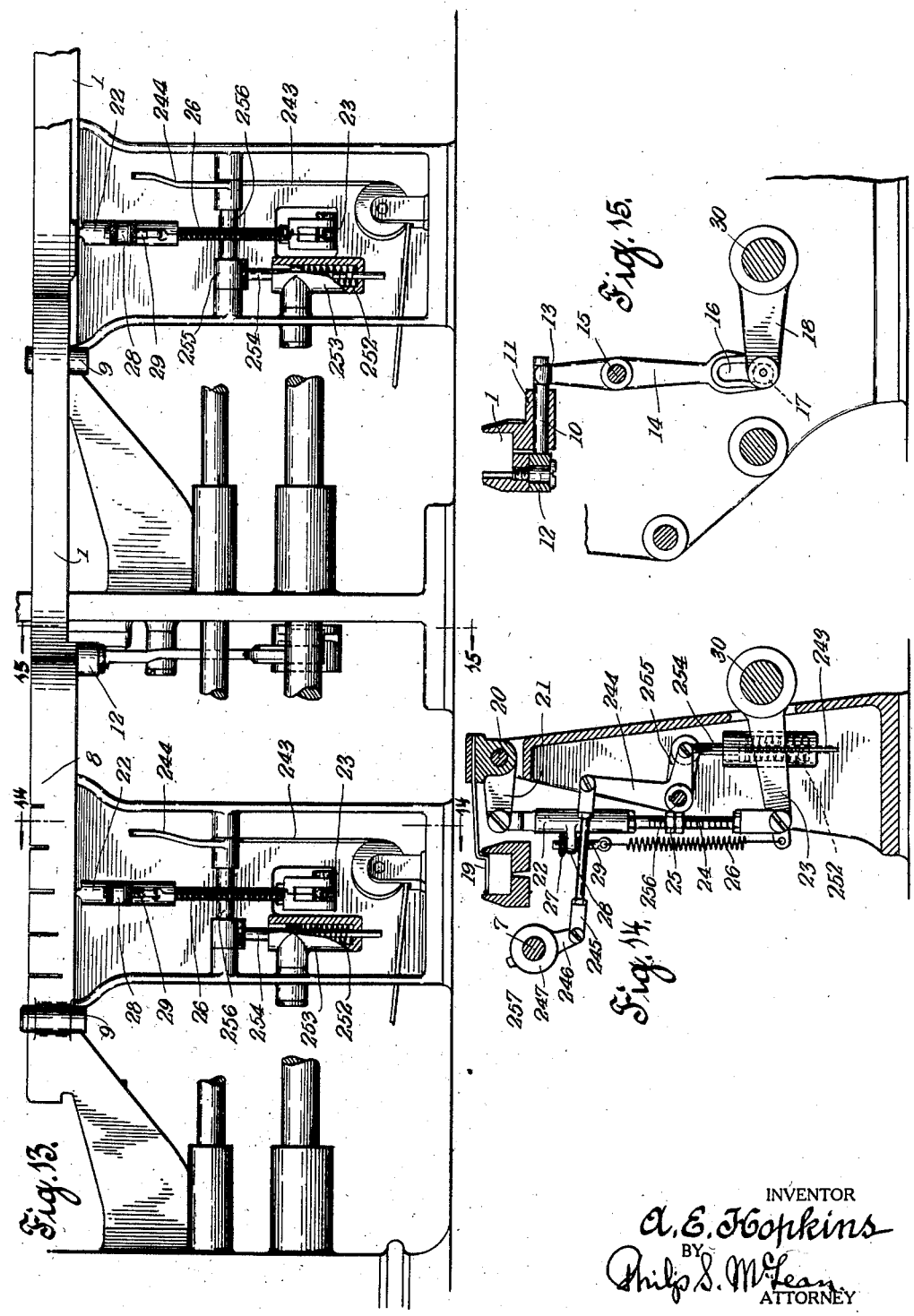

Feb. 14, 1928.
A. E. HOPKINS
1,659,143
ARTICLE WRAPPING MACHINERY
Filed June 2, 1924    19 Sheets-Sheet 11
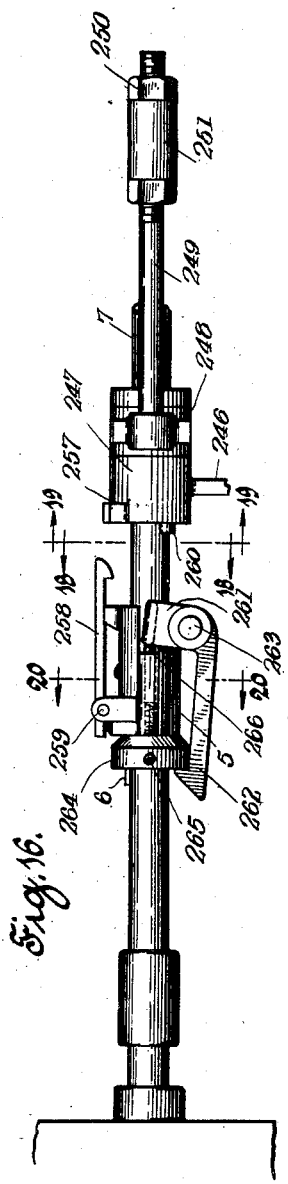
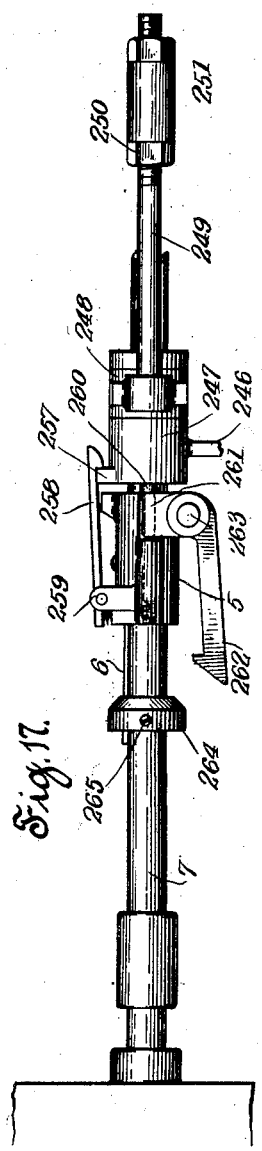
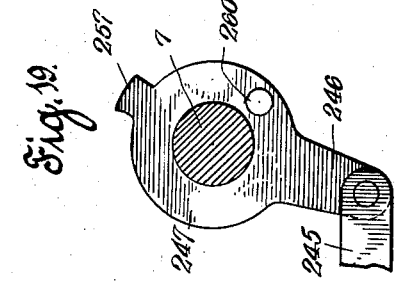
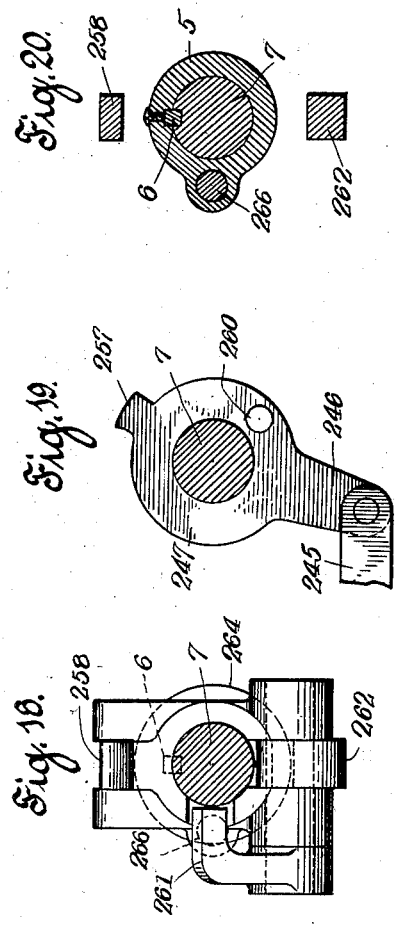
INVENTOR
A. E. Hopkins
BY
Philip S. McLean
ATTORNEY

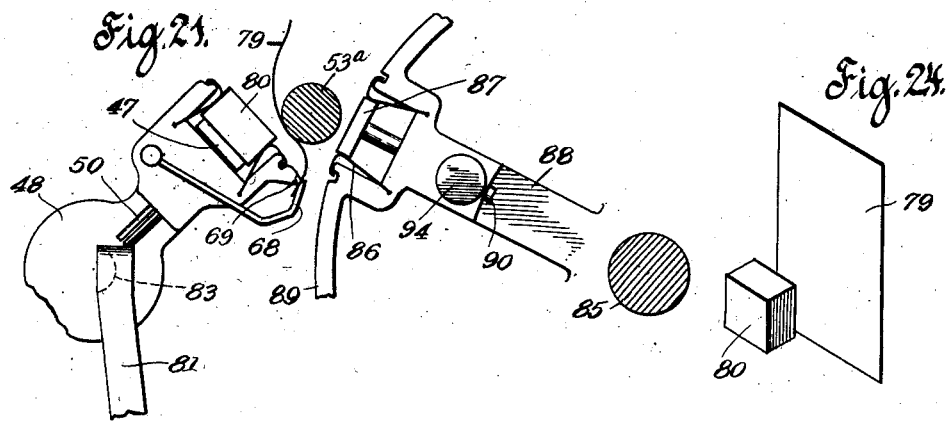
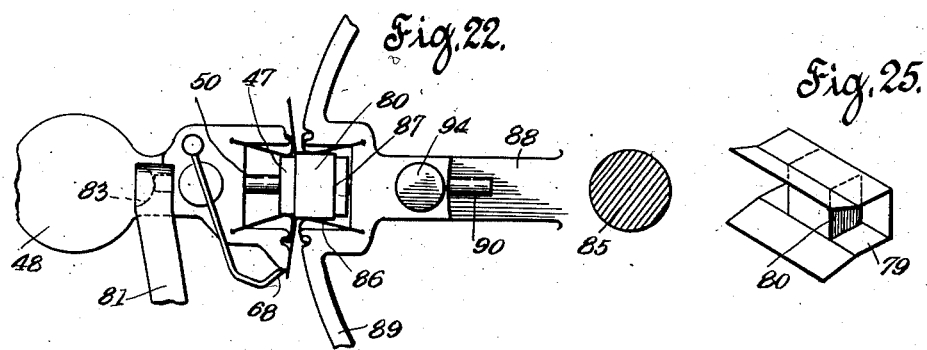
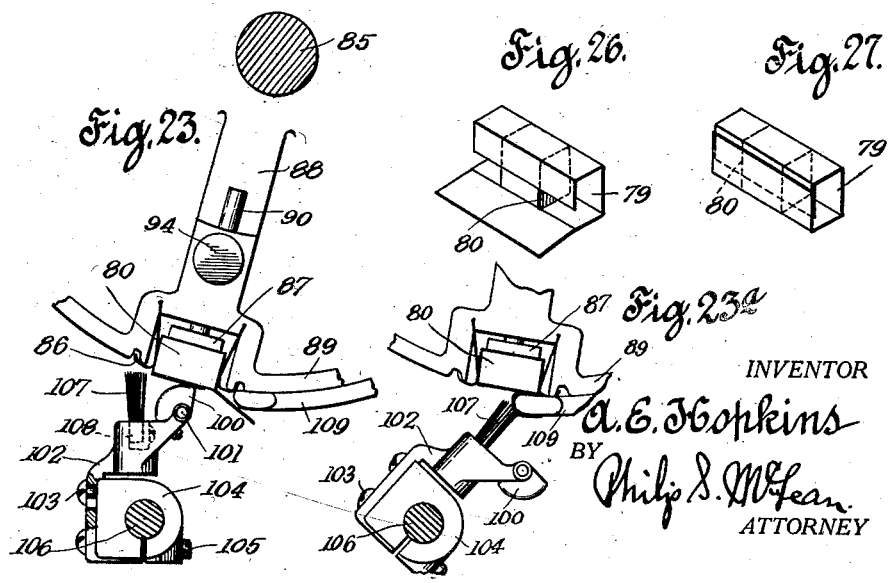

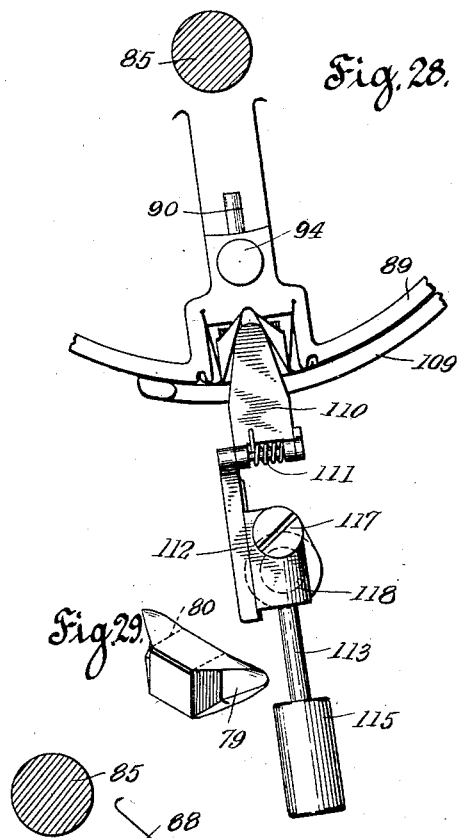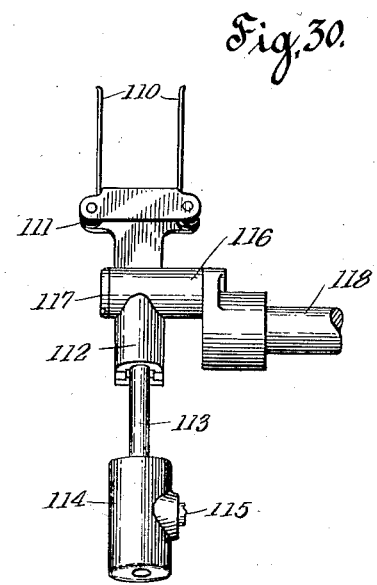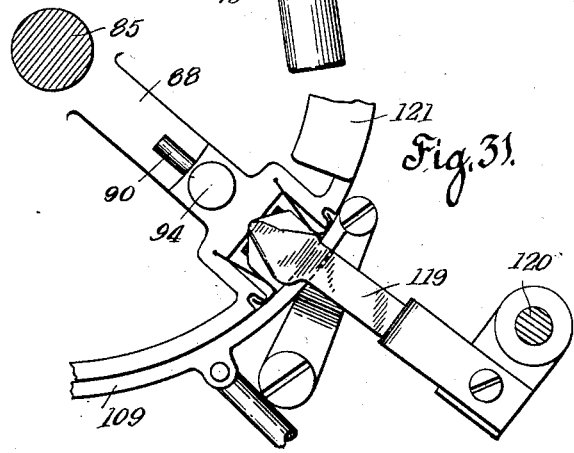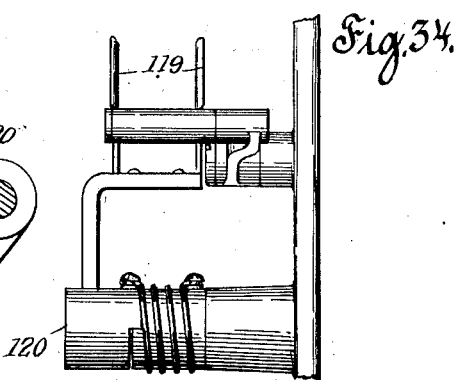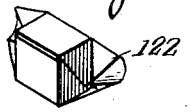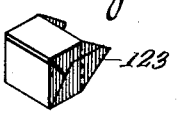

Feb. 14, 1928.

A. E. HOPKINS 1,659,143

ARTICLE WRAPPING MACHINERY

Filed June 2, 1924 19 Sheets-Sheet 14

INVENTOR
A. E. Hopkins
BY
Philip S. McLean
ATTORNEY

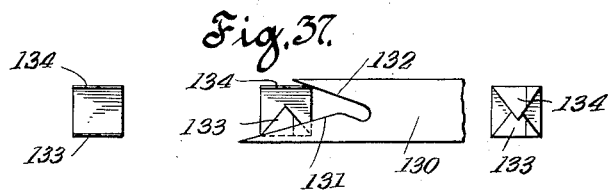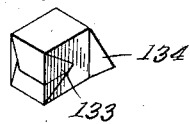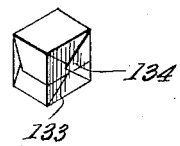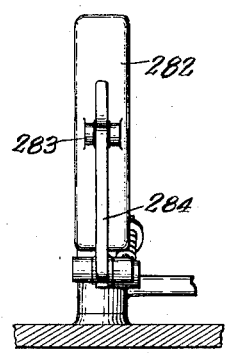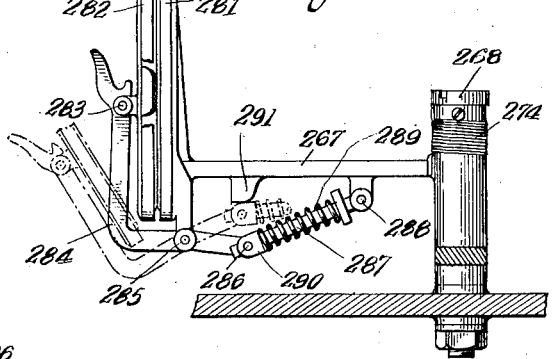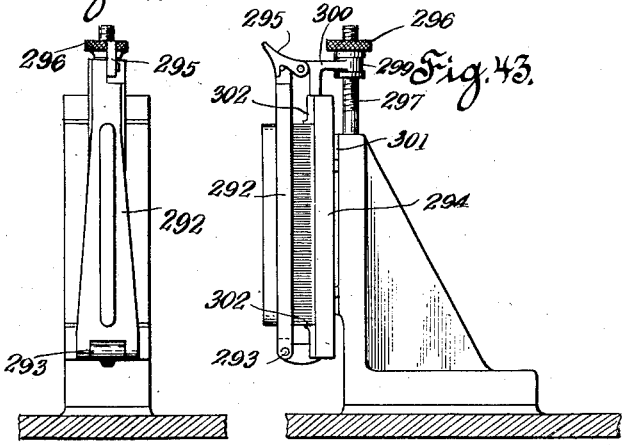

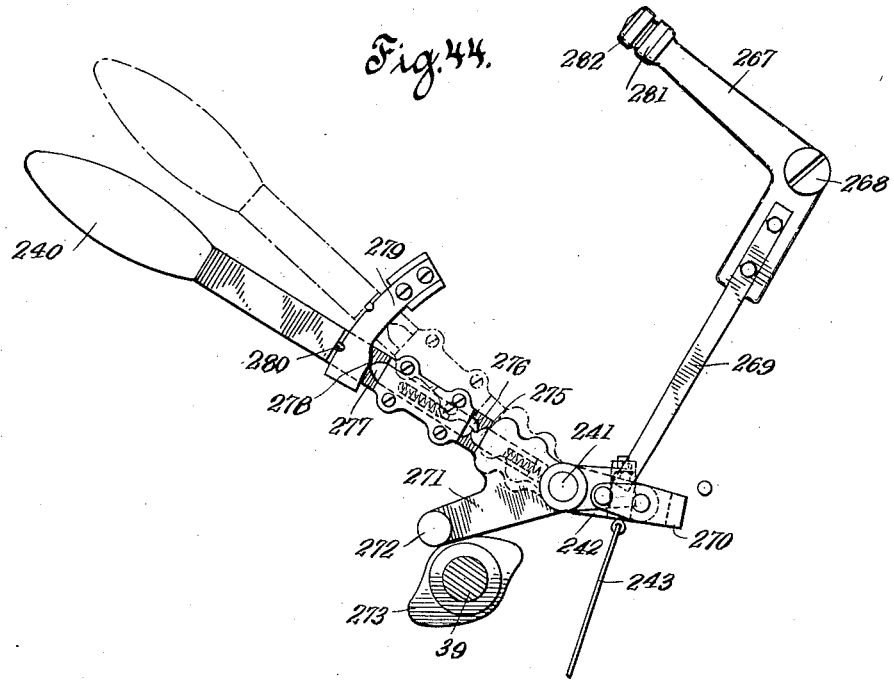
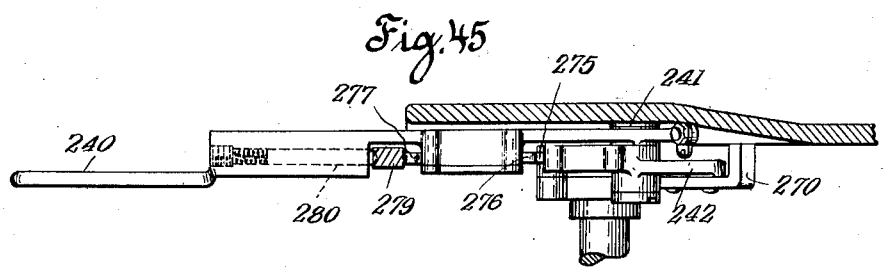

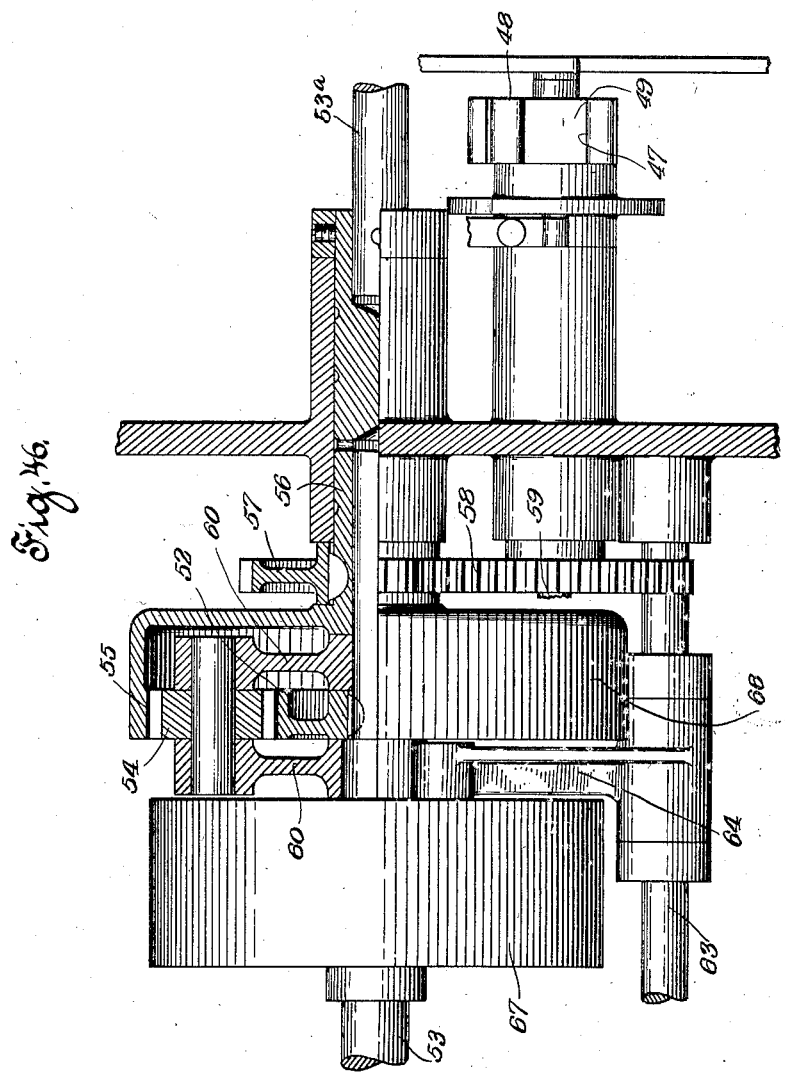

Feb. 14, 1928.
A. E. HOPKINS
1,659,143
ARTICLE WRAPPING MACHINERY
Filed June 2, 1924   19 Sheets-Sheet 18
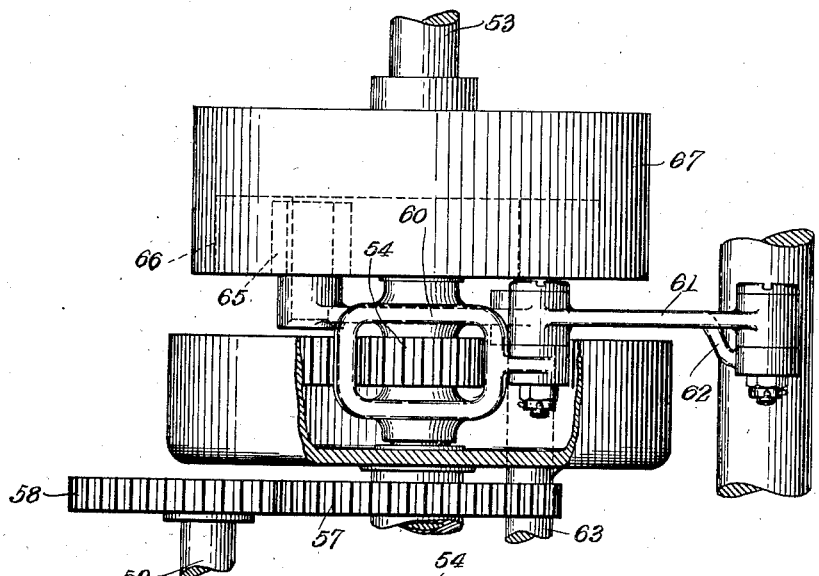
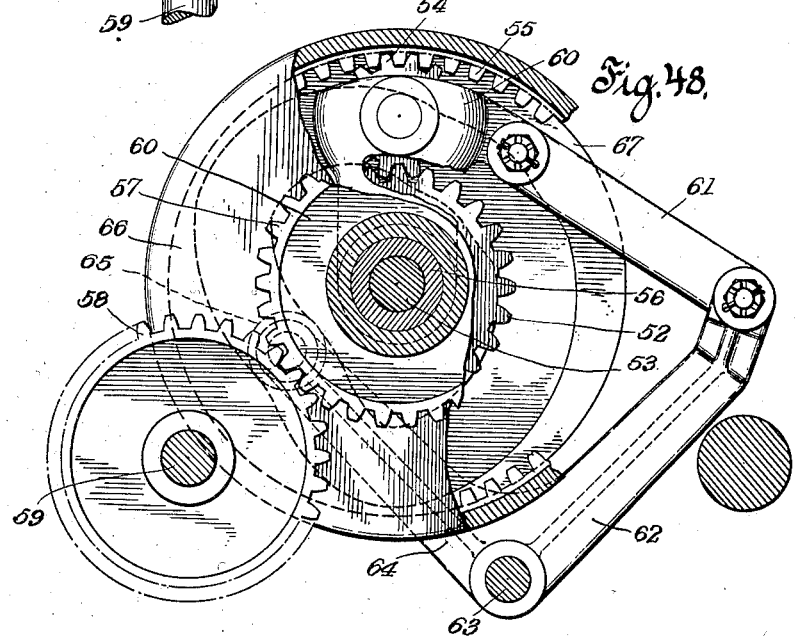
INVENTOR
A. E. Hopkins
BY
Philip S. McLean
ATTORNEY Feb. 14, 1928.
A. E. HOPKINS
1,659,143
ARTICLE WRAPPING MACHINERY
Filed June 2, 1924      19 Sheets-Sheet 19
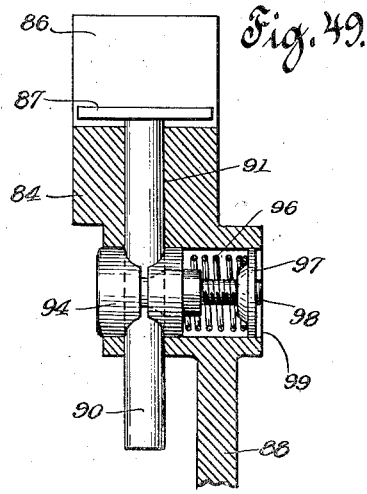
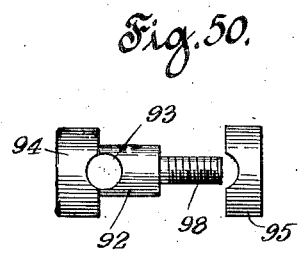
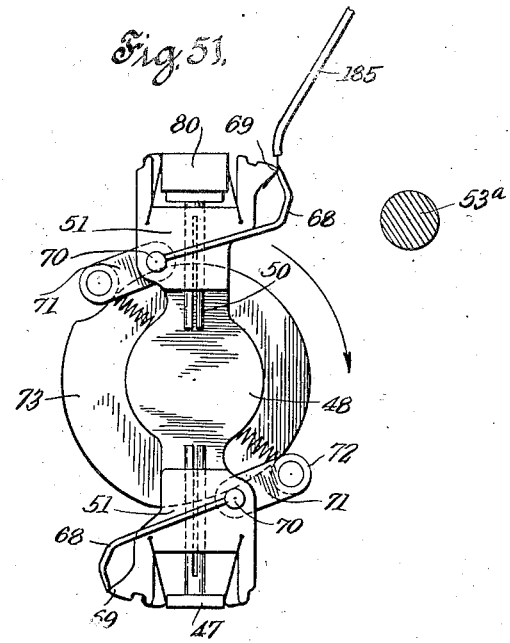
INVENTOR
A. E. Hopkins
BY
Philip S. McLean
ATTORNEY Patented Feb. 14, 1928.

1,659,143

UNITED STATES PATENT OFFICE.

ARCHIBALD E. HOPKINS, OF MIDDLETOWN, NEW YORK, ASSIGNOR TO PAUL F. BEICH COMPANY, OF BLOOMINGTON, ILLINOIS, A CORPORATION OF ILLINOIS.

ARTICLE-WRAPPING MACHINERY.

Application filed June 2, 1924. Serial No. 717,343.

This invention relates to the cutting, wrapping and packing arts and in particular to the cutting, wrapping and packing of caramels.

Special objects of the invention are to provide mechanism for the purpose which will be as nearly as possible automatic in operation, require a minimum of attention, will operate at high speed, be compact in size and efficient and practical in every way.

The foregoing and other objects are attained by certain novel features of construction, combinations and relations of parts, the particulars of which will appear in the course of the following specification.

The drawings accompanying and forming part of this specification illustrate a practical commercial embodiment of the invention, but as this illustration is primarily for purposes of disclosure, it should be understood that the structure may be modified and changed in various respects without departure from the spirit and scope of the invention as hereinafter defined and broadly claimed.

In the drawings:

Figure 1 is a side elevation of a complete "duplex" machine, with certain portions of the two wrapping mechanisms omitted to save undue complication of the drawing.

Figure 2 is an elevation of the machine viewed from the opposite side with the two wrapping mechanisms shown more nearly in complete form.

Figure 3 is a broken top plan view of the machine also with parts of the wrapping mechanisms omitted.

Figures 4 and 5 are views of the packing and the wrapping ends of the machine respectively, the latter as taken on substantially the plane of line 5—5 of Figure 3.

Figure 6 is an enlarged broken front elevation of the duplex wrapping mechanisms, the one at the left being shown as in operative condition and the one at the right appearing as when the caramel feed is tripped.

Figure 7 is a sectional view across the machine as taken on substantially the plane of line 7—7 of Figure 6.

Figure 9 is a broken detail part sectional view of the end portion of the caramel feeding chute showing the caramel feeding blade, the last two of the rotary knives, the plunger which lifts the caramel to the transfer head and the caramel detector mechanism.

Figure 10 is a cross sectional view of these parts as taken on substantially the plane of line 10—10 of Figure 9.

Figure 11 is a broken sectional view showing the mounting of the reel of wrapping material.

Figure 12 is a broken plan view of the feed chute with the associated hold-down fingers, caramel elevating plunger and detector mechanism and the drive for the caramel feed, the latter being shown in operative condition.

Figure 13 is a broken front elevation of the feed chute and part of the connections controlling the caramel feeding operations.

Figures 14 and 15 are cross sectional views on substantially the planes of lines 14—14 and 15—15 of Figure 13 showing in the first of these views the hold-down finger operating mechanism and caramel trip feed collar and in the second of these views, the caramel sizing portion of the feed chute.

Figures 16 and 17 are detail front views of the caramel feed drive showing it first in the active coupled relation and then in the inactive latched condition.

Figures 18 and 19 are cross sectional views taken on the section line and looking in the direction of the arrows 18 and 19 respectively shown in Figure 16.

Figure 20 is a similar view on substantially the plane of line 20—20 of Figure 16.

Figures 21 and 22 are broken detail views illustrating the taking of the wrapper by the gripper on the transfer head and the shifting of the caramel from the transfer pocket into the wrapping wheel pocket.

Figure 23 is a similar view showing the first top folder in operation and Figure 23ª the second top fold as about to be made by the stationary top folder plate.

Figures 24, 25, 26 and 27 are detail views illustrating the successive actions described.

Figure 28 is a broken detail illustrating the action of the end tucker, and

Figure 29 the caramel and wrapper with the end tucks made therein.

Figure 30 is an edge view of the end tucker.

Figure 31 is a broken detail showing the first end folder in operation, and

Figure 32 a view of the caramel with the first end fold of the wrapper turned in.

Figure 33 is a detail showing the second end fold of the wrapper turned in by passage of the caramel beneath the stationary end folder plate.

Figure 34 is an edge view of the first end folder.

Figure 35:
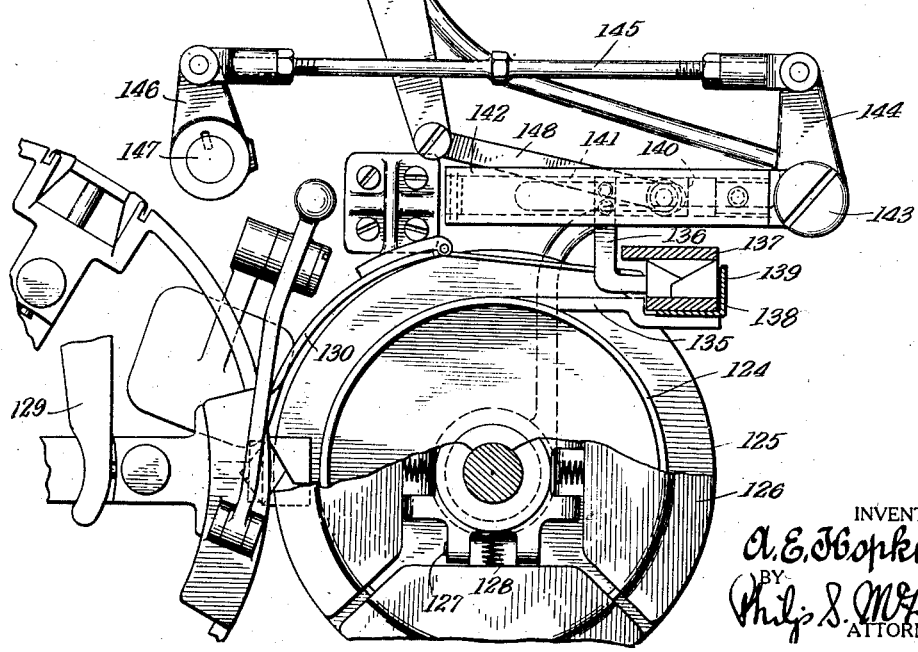

Figure 35 is a broken detail view illustrating transfer of the caramel from the pocket in the carrier wheel into the grip of the flanges on the take-off wheel—also shifting of the fully wrapped caramel from the take-off wheel in between the transfer tapes.

Figure 36:
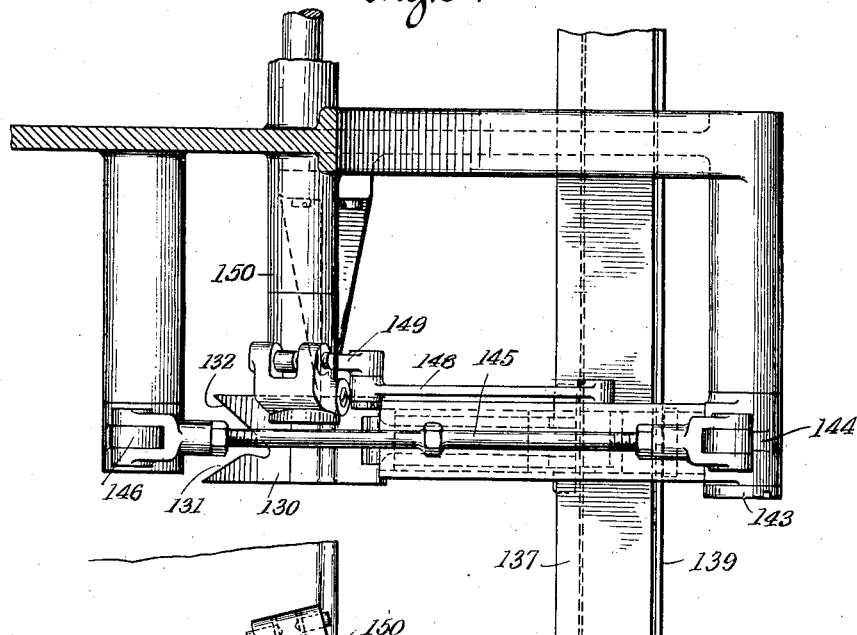

Figure 36 is a partial plan view of the last mentioned parts showing particularly the stationary final folder overlying the take-off wheel.

Figure 37 is a broken plan illustrating travel of the caramel under the final folder and the successive turning in of the points of the wrapper.

Figures 38 and 39 are perspective views of the caramel showing the turning in of the first flap or point followed by the turning in of the last flap.

Figures 40 and 41 are edge and plan views respectively of the paper detector finger.

Figures 42 and 43 are like views of the adjustable paper guide.

Figures 44 and 45 are side and sectional plan views respectively of the manual and automatic control for the caramel feed.

Figures 46, 47 and 48 are sectional side, plan and end views respectively of the gearing for alternately stopping and then synchronizing the transfer head with the continuously traveling wrapping wheel.

Figures 49 and 50 are vertical sectional and detached detail views respectively of one of the self-centering clamps or brakes for the wrapping wheel plungers.

Figure 51 is a detail of the transfer head with the lower pocket in position to take a caramel from the elevating plunger and the gripper for the upper pocket just closing upon a wrapper.

The following general description will facilitate an understanding of the invention.

General description.

In the form of apparatus disclosed, the entire action, starting with the feeding of the caramel strip and ending with the packing of the wrapped caramels in their cartons, is practically automatic. In Figure 1 two independently operating wrapping units A and B are shown supplying wrapped caramels to a conveyer C extending to a stacker D, from which the caramels are removed a boxful at a time by inverting the boxes over the top of the stack and then righting them with the contained loads.

Figure 8:
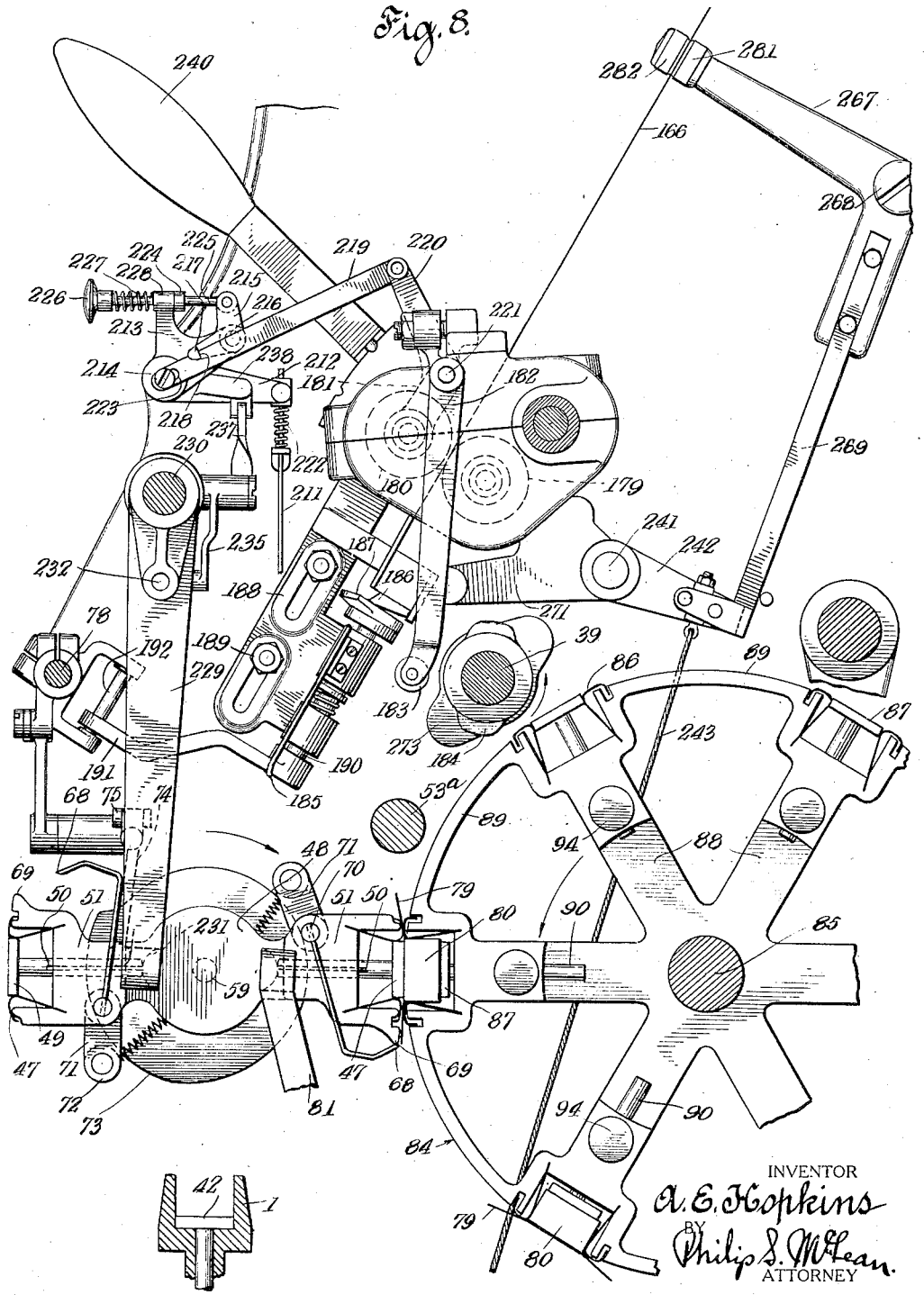
Figure 8 is a further enlarged broken and part sectional view of the cooperating transfer head and carrier wheel, paper feed and cut-off mechanism.

A caramel strip is fed step by step to each wrapping unit beneath a gang of rotary knives of progressively increased diameter, Figures 2 and 6, and the caramel severed by the final cutter is lifted by a reciprocating plunger into one of the pockets in a two armed transfer head, Figures 8 and 9 which revolve a half turn after receiving each caramel.

In the upper position of rest indicated in Figure 51, a gripper on the transfer head takes a length of wrapping material which has been fed down and severed from a supply roll and in the course of the next half turn, the transfer head carrying the caramel and wrapper is brought into synchronism with a constantly rotating wrapping wheel and the caramel with the wrapper is thereupon shifted over into a pocket in the wrapping wheel, Figures 21 and 22. The caramel with the wrapper "channeled" about the same thereupon takes up the continuous movement of the wrapping wheel and is carried first past a rotating folder blade which makes the first top fold, Figure 23, then under a stationary folder plate which turns the second top fold in over the first, then to an oscillating and reciprocating tucker which breaks in the outer sides of the "tubed" wrapper, Figure 28, next past oscillating first end folder blades, Figure 31, followed by stationary second end folding plates at the sides of the wheel. The caramel with the folded but projecting end flaps or ears is then shifted from the pocket in the wrapping wheel over between end gripping flanges on a take-off wheel, Figure 36, which in the course of its continuous rotation carries the flaps successively beneath first and second flap folding edges, Figures 36 and 37, after which finishing operation the completely wrapped caramel is discharged into the grip of the cooperating tapes forming the carrying-off conveyer.

Controls are provided for the caramel feed and the paper feed and these may be interlinked so that the one will control the other. Also, a "rejector" is provided, cooperating with the transfer head, Figure 8, to throw out imperfect caramels before reaching the wrapping wheel.

Strip feeding, sizing and holding.

The caramel stock is fed to each wrapping unit in the form of a bar or strip through a chute or trough 1 where it is engaged by the toothed edge of a blade 2, Figures 9 and 10, working up through a slot 3 in the bottom of the trough. This feeding blade is carried by an arm 4 extended inward under the trough from a sleeve 5 keyed at 6 on a shaft 7 having successive oscillatory and longitudinal reciprocating movements to first lift the blade into engagement with the strip, then advance the strip a caramel length, along the chute, lower the blade away from the strip and then bodily retract the blade into position for a fresh hold on the strip.

A sizing effect is exercised on the strip in the trough by hinging a side section 8 of the trough at one end as shown at 9 in Figure 12 and vibrating this section so as to exert a slight squeezing effect on the strip in the periods between the feeding strokes of the blade. This so-called "breathing" movement is imparted from the trough wall in the construction disclosed by a rod 10 sliding in a bearing 11 at the under side of the trough and having a loose pivotal connection with the free end of the movable trough wall at 12 and engaged by a fork 13 at the upper end of a vibrating lever 14 pivoted at 15 and having a cam slot 16 at its lower end engaged by a roller 17 on a properly timed oscillating arm 18, Figure 15. The slide rod 10 thus serves both as a support for the free end of the caramel gaging device and as a connection for actuating the same.

The caramel strip is gaged at the top and held down to the bite of the toothed feed blade by a series of hold-down fingers 19, Figures 12 and 14, pivotally supported on the rear of the trough at 20 and having a forwardly extending arm 21 connected by an adjustable link 22 with an oscillating arm 23. The adjustable link is shown as made up of relatively telescoping parts, one in the form of a screw rod 24 slidingly fitting in a socket in the other part and carrying nuts 25 serving by engagement with the end of the socket to limit the telescoping movements of such parts. A spring 26 connected between the rock arm 23 and the body or sleeve part of the link allows the parts to yield longitudinally and therefore imparts to the hold-down fingers, a spring tension which is regulatable in the illustration by a nut 27 engaging a bearing lug 28 on the sleeve portion of the link and threaded on a screw stud 29 connected to the upper end of the spring. The hold-down fingers themselves may be made of spring steel to give them a certain yielding character and the adjustability of the tension spring together with the adjustment of the stop nuts provides a readily regulatable means for applying any desired hold-down pressure to caramel strips of different size or texture. As the side gaging device and hold-down clamps both operate while the caramel strip is stationary, both rock arms 18 and 23 may be mounted on the same rock shaft 30.

*Cutting.*

The strip is cut to successively greater depths by a series of rotary knives 31 of successively larger diameter spaced a caramel length apart and bodily raised and lowered over the caramel trough from the rock shaft 30 by rocker arm 32 pivoted to a link 33 extended downward from the end casing 34, Figures 5 and 7, which encloses the gearing or chain drive 35 for the cutter shaft 36. The shaft 37 in the upper end of this housing is driven by spur gear or chain connections 38 from a continuously rotating shaft 39 and the casing 40 for the latter drive connection is pivoted at its opposite ends on shafts 37 and 39 so as to operate as a swinging link for guiding and supporting the upper end of the casing 34 which serves as part of the framing 41 for the cutters.

The parts are timed so that the knives act on the strip when the latter is held stationary, the first or smaller knife making an initial cut and the other knives operating each in a cut started by the preceding knife, each knife thus increasing the depth of cut and the final knife completing the severance of the caramel from the end of the strip. In this way the strip is cut gradually with a "draw cut" and a clean severance is produced without crystallizing, chipping or spreading the caramel stock.

At each stroke of the rotary knives, a caramel is thus severed from the strip and a series of cuts are made defining the lines of severance of successive caramels. This enables the machine to operate at high speed, yet without forcing the cutting.

After each cutting stroke of the rotary knives, the stock is advanced a caramel length by the reciprocating and oscillating feed blade and preferably the parts are timed so that the hold-down fingers will momentarily retain their grip on the strip as the knives are leaving the cuts, to prevent adherence of the caramel stock to the knives and this delay also gives the feed blade time to lift up into engagement with the bottom of the strip while the strip is being held down in the chute. The hold-down and sizing devices release their hold on the strip and the strip is then free to be advanced by the feed blade.

*Transfer.*

The feed stroke of the strip feeding blade 2 carries the loose or cut caramel in front of the strip over the top of an elevating plunger 42 at the end of the feed trough which is actuated from a rock shaft 43, Figures 7, 9 and 10, by a rocker arm 44 pivotally linked at 45 to the lower end of the stem 46 of the plunger.

This plunger is timed to follow the feed stroke of the feed blade 2 and to lift the caramel positioned thereover into the pocket 47 in a two armed transfer head 48 while that head is stationary with the lower pocket directly over the plunger, as shown in Figures 9 and 51.

The bottoms of the pockets in the transfer head are formed by plungers 49 having split stems 50 working in bearings 51 and tensioned to frictionally hold the plungers in the positions to which they are shifted.

The transfer head is intermittently rotated, a half revolution at a time, starting from the periods of rest with the lower pocket directly over the elevating plunger and the upper pocket in line with the paper feed and accelerating to a condition where the transfer head is traveling in synchronism with the constantly rotating wrapping wheel so as to enable transfer of the caramel and wrapper from the transfer head pocket to a pocket in the wrapping wheel, Figures 8, 21 and 22, at the moment these synchronously traveling pockets come into register.

This alternate stopping and synchronous travel of the transfer head is effected by the gearing shown in Figures 46, 47 and 48 and comprises the gear 52 fixed on the continuously turning main drive shaft 53 engaged by a pinion 54 meshing with a surrounding ring gear 55 loosely journaled on the shaft and carrying on its hub 56, a gear 57 in engagement with a gear 58 fast on the transfer shaft 59. The epicyclic pinion 54 is journaled between the arms of a bracket 60 loosely supported on the main shaft and oscillated by a pivoted link 61 pivoted to one arm 62 of a bellcrank supported at 63, the other arm of which, 64, carries a roller 65 engaged in the groove 66 of a cam member 67 fixed on the drive shaft. It will be clear that upon oscillation in one direction the pinion will override the drive gear, causing the balance of the gear train to idle and the transfer head to remain at rest and that at the end of such movement the pinion will become effective to start the train, then speed it up as the motion of the pinion is reversed and finally bring it gradually to a stop at the end of the pinion movement and start in the over-travel direction.

This construction therefore results in the transfer head being both started and stopped gradually and being quickly brought up to a speed in synchronism with the travel of the continuously rotating wrapping wheel.

The transfer head is equipped to take the wrappers by providing it with grippers 68 cooperating with shoulders 69 at the forward edges of the pockets, said grippers being pivoted at 70 and having rearwardly extending arms 71 carrying rolls 72 to ride on a cam 73 journaled on the transfer shaft. By this construction the grippers are opened when the pockets reach the uppermost position indicated in Figure 51, and then the cam is rotated backwardly a distance sufficiently to cause the grippers to take hold of the wrapper by a link 74 connected with the back of the cam and pivoted to one arm of a bell-crank 75, Figure 6, whose upper arm is connected by a pivoted link 76 with an arm 77 on a reciprocating shaft 78. With this construction the grippers are opened in time to receive the paper fed downward by paper feed rolls and are closed to grip the same before or approximately at the moment the transfer pocket starts from its upper position to take up the synchronous motion of the wrapping wheel.

The accelerated travel of the transfer head causes the wrapper to whip backward on a curve such as indicated in Figure 21 underneath the transfer head drive shaft 53ª and down into position overlying the pocket in the wrapping wheel. The shaft thus assists in guiding the wrapper into position over the wrapping wheel pocket and the bending back of the wrapper in the manner described smooths it out and places it under a certain amount of tension, overcoming any possible wrinkling tendencies and causing it to pass smoothly and tightly stretched over into the pocket in the wrapping wheel.

The transfer plungers are actuated to transfer the wrappers 79 and caramels 80 over into the pockets in the wrapping wheel, Figure 22, by lever 81 projecting up from the rock shaft 82 and having an arcuate lug 83 to engage the inner ends of the plunger stems 50. The action of this lever is relatively rapid to produce a quick shifting of the caramel and wrapper from the transfer head to the carrier wheel while these parts are traveling in synchronism and approximately at the moment when the pockets are in direct alinement.

Wrapping wheel.

The wrapping wheel 84 is fixed on a continuously rotating shaft 85 and in the illustration has a series of six equidistantly spaced pockets 86 with plungers 87 forming the bottoms of the same.

The carrier wheel is shown as of skeletonized construction, involving simply a series of six radial arms 88 carrying the pockets in the ends of the same and connected by rim segments 89.

The plungers 87 are shown in Figure 49 as having stems 90 sliding in radial bearings 91 in the outer ends of the arms or spokes of the wheel and held in differently adjusted relations by columns of special construction, consisting in each instance of a stud 92 having a transverse opening 93 for the free passage of the plunger stem, with a fixed head 94 for engagement with one side of the stem and a movable head 95 slidingly engaged on the hub for contact with the opposite side of the stem, the pressure of these two cooperating clamp members being controlled by a spring 96 interposed between the back of the movable clamp head and a nut 97 adjustable on the threaded end portion 98 of the stud.

This entire clamp construction is seated in a transversely disposed passage 99 intersecting the stem bearing, the walls of which confine the clamp against any appreciable motion in the longitudinal direction of the plunger stem, but permit the clamp to adjust itself transversely with respect to the stem. This form of mounting enables the clamp to center itself upon the stem so that there is no side thrust on the stem and hence no wearing or binding tendencies.

With this construction also it is possible to readily adjust the clamps to the exact tension desired for holding the plungers.

Top folds.

Immediately after the caramel is transferred to the wrapping wheel and by that action the "channeling" of the wrapper is effected, Figures 22 and 25, the first top fold is made, Figures 23 and 26, by a spring pressed folder blade 100 pivoted at 101 on the bracket 102 adjustably secured at 103 on the block 104 which in turn is secured angularly adjustable at 105 on the rotating shaft 106.

The fold thus made is smoothed and held down by a follower brush 107 adjustably secured at 108 on the folder blade supporting bracket 102, which brush serves the additional purposes of tucking the edge of the first top fold in under the second top fold flap, Figure 23ª, and of tensioning the second flap back over the edge of the peripherally extending second fold plate 109. By thus reversing the second fold over the edge of the second fold plate, the wrapper is put under tension and smoothed out so that when it is pressed down over the first fold, it lies flat and forms a close-fitting tube about the caramel, Figure 27. The adjustability of the rotating folder blade and brush radially toward or away from the wrapping wheel, either independently or both together, enables proper co-relation of the parts to suit various sizes and kinds of caramels and wrappers.

End folds.

The circumferentially extending top fold plate 109 is of sufficient peripheral extent to hold the top folds in place while the caramel is traveling past the end tucker and end folding devices. The end tucker is shown in Figures 28 and 30 as consisting of a pair of spring pressed blades 110 pivotally supported on pins 111 carried by a bracket 112 having a rearwardly extending stem 113 sliding in a rocking bearing 114 pivoted at 115. The bracket or base 112 on which these blades are mounted has a transverse bearing 116 receiving a crank pin 117 on a rotating shaft 118. As a result the tucker blades are given a part-rotary oscillatory movement toward and away from the wrapping wheel, causing them to break in the doubled outer end portions of the wrapper, as indicated in Figure 29, with a quick, easy, positive action approximating the travel of the wrapping wheel.

The first end folds are made by oscillating blades 119, Figures 31 and 34, carried by a rock shaft 120 which approach and engage the rearward sides of the tucked ends and then travel along with the wrapper until the forward sides pass in under the relatively stationary side folding plates 121, the blades 119 being retracted just prior to the passage of the folds in under such side plates.

As a result of the action of the end folding blades 119 and the side folding plates 121, the rearward end folds of the wrapper are first turned in as shown at 122 in Figure 32 and the forward end folds 123 are then turned down over the same as shown in Figure 33.

Take off.

A take off wheel 124 is shown provided at the rear of the wrapping wheel having a rigid flange 125 and opposed to that, spring pressed flange segments 126 pivoted at 127 and acted on by springs 128. These relatively movable flanges provide a series of grippers to receive the caramels and carry them to the conveyer belts.

The discharge of the caramels from the wrapping wheel to the take off wheel is effected by a rocking lever 129, Figure 7, which engages the inner ends of the plunger stems to thrust the caramels from the wrapping wheel pockets outward into the grip of the flanges on the take off wheel, Figure 35. If the wrapped caramels are undersize, in the sense of being less than a certain average length, they will not be gripped by the flanges and so will drop from between said flanges. The take-off wheel thus acts also as a detector for undersize caramels and as a means for separating the undersize from the normal size wrapped articles.

The take off wheel rotates in synchronism with the wrapping wheel and thereby carries the caramel with the projecting points of the wrapper up under a guide 130, Figures 35, 36 and 37, which has inclined edges 131, 132, set one in advance of the other so as to first turn down one projecting point 133 of the wrapper and then to lay the second point 134 down over the first, Figures 38 and 39.

With the final folds thus formed, the caramel passes on to a stripper 135 extended from the rear in between the take off flanges and a pusher 136, Figure 35, is then engaged with the caramel to shift it from the stripper in between the upper and lower carry off belts 137, 138. A guard 139 at the back of these belts prevents the caramel from being shifted too far.

The pusher 136 is shown carried by a block 140 sliding in a guideway 141 in a bar 142 pivoted at the rear at 143. This bar is rocked by a rock arm 144 engaged by a link 145 extended from a rock arm 146 on rocker shaft 147 and the slide is shifted back and forth in its guideway by a pivoted link 148 connected with a rock arm 149 on rock shaft 150, the parts being timed so that in the retractive stroke of the slide the guideway will be lifted so as to cause the pusher to pass to the rear of the caramel on the stripper so that when the guide is lowered and the slide shifts outwardly, the pusher will engage the rear side of the caramel and shift it over in between the conveyer tapes.

*Conveyer.*

The upper and lower conveyer belts 137, 138 are supported on continuously running pulleys 151, 152 at opposite ends of the machine, Figures 1, 2 and 3, and extend from the one or more wrapping units to the packer at the far end of the machine. In the case of a multiple wrapper unit machine, such as illustrated, the parts are timed so that the wrapped caramels from one wrapper will be positioned between the belts in the spaces left between the caramels supplied to the belts from the other wrapping units, so that the belts will carry a substantially equidistantly spaced single row of caramels.

*Packer.*

As the packer constitutes in itself a separate invention, fully disclosed and covered in a separate application, it will be described here only sufficiently to bring out its combinative relation to the rest of the machine.

The conveyer belts extend straight through the packer mechanism, Figure 2, so as to deliver the caramels in a single row, as shown at 153, against an end trip 154 which, when the row is complete, is tripped to throw into operation, a row feeder 155 which shifts the row over bodily toward the stack in Figure 4.

After a predetermined number of rows have been shifted laterally in this fashion to form a layer, a layer feeder 156 is then automatically brought into action to shift the layer over a pan or plate 157 positioned above the elevator 158. This elevator lifts the plate of caramels a distance slightly greater than the caramel height to carry the plate past the hooks of a series of plate supporting dogs 159 which support the plate or tray with the superposed stack of caramels in elevated position while the elevator is lowered.

The stack in the formative period passes up through a rectangular guide 160 and the trays above the bottom tray are automatically withdrawn from in between the caramel layers by hooks 161 on a reciprocating carriage 162 which automatically lowers them one at a time and replaces them in position over the elevator.

As the stack grows in height it passes up between the corner guides 163. To aid in removing the caramels from the top of the stack, a box-load at a time, a frame 164 is positioned over the top of the stack, said frame being tapered and fitting snugly over the stack and further having a flange 165 to receive the edge of a box inverted thereover. The box, after being inserted over the follower frame is pushed down over the stack, the full depth of the box, after which a separator plate may be inserted between the layers at the edge of the box; whereupon, by lifting said separator, the box with its load can be removed from the stack and the box restored to upright position, completely filled with the desired number of layers of caramels. In the application referred to, special mechanism by which cardboard separators are inserted between the layers, is disclosed but as that relates primarily to the packer structure, the same will not be considered here.

*Wrapper supply.*

The wrapper material, usually a strip of waxed paper 166, is shown supplied in the form of a reel or roll 167, Figures 7 and 11, mounted on a tubular core 168 of cardboard or the like which is slipped over a mandrel 169 journaled on a stud shaft 170. This mandrel is constructed with pivoted spring pressed segments 171 yieldingly gripping the inside of the core and the reel is positioned axially to the mandrel by a flange 172 adjustably secured thereon by a set screw 173. This flange may be set for different widths of wrapper so that the reel may be centered in proper position by simply forcing it on over the spring mandrel against the flange. The reel is shown equipped with a brake drum 174 normally engaged by a spring pressed pivoted lever 175 carrying a guide roll 176 at its upper end over which the strip is passed so that a pull on the strip will momentarily release the braking effect.

Other guide rolls 177, 178 direct the strip to the feed rolls 179, 180, Figure 8. Both feed rolls 179 and 180 are rotated continuously, but the latter of these is carried by a pivoted arm 181 which is actuated by a lever 182 provided at its lower end with a cam roll 183 in engagement with cam 184. These parts are so designed that the rolls will be automatically separated each time a wrapper length of the strip is fed down through the paper guide 185.

The strip is cut in wrapper lengths by a shear comprising a stationary blade 186, Figure 8, and cooperating pivoted blade 187, both mounted on a bracket 188 adjustably secured at 189 to suit different wrapper lengths.

The actuation of the shear is effected by providing the shaft 190 of the movable blade with an arm 191 forked to take the pin 192 on the reciprocating shaft 78, which pin is disposed substantially parallel to the line of adjustment of the shear and is of sufficient longitudinal extent to remain engaged by the fork of the shear lever, irrespective of the adjustment.

*Paper feed control.*

In the present disclosure, provision is made for automatically interrupting the paper feed in the event of a failure in the caramel feed or the feeding of an imperfect caramel.

Special mechanism is therefore provided for detecting imperfect caramels or the absence of a caramel, including detector fingers 193, Figures 9 and 12, operating in slots 194 cut in the corners of the elevating plunger 42 adjustably mounted in clamps 195 on the upper ends of levers 196 pivoted at 197 and independently positioned under the tension of light springs 198. These detector fingers are shown made in the form of wire loops which can be readily bent to suit them to different sizes and shapes of caramels and are further shown as having inwardly projecting extensions 199 disposed in front of the hooks 200, which are normally supported in position overstanding the head of the plunger. These hooks are shown as pivoted at their lower ends at 201 at the end of a lever 202 and as lightly held in position overstanding the plunger head, each by a spring tensioned lever 203 engaged with a rearward extension or lug 204 at the heel of the hook. Each hook also has a forward extension 205 at the toe of the same to interlock over a shoulder 206 on the lower end of the detector lever 196 to support the hook in elevated position once it is lifted by the plunger.

The lever 202 which supports the hooks 200 is shown fixed to a shaft 207 having two rearwardly extending arms 208 and 209, the first of these adapted to engage an adjustable stop screw 210 by which the hooks can be set to just clear the top of the plunger and the second of these being connected by a link 211 to the arm 212 of a bracket or supporting plate 213 pivoted at 214 and carrying a latch 215 pivoted at 216 and provided with a tooth 217 for engagement in a notch 218 in a link 219 connected with an arm 220 fixed on the supporting shaft 221 for the movable paper feed roll 180, Figure 8.

A spring 222 normally holds the latch bracket swung outwardly, as in Figures 7 and 8, with the tooth of the latch held clear of the notch in the link 219, which is slidingly supported at its free end at 223 so as to slide back and forth with the vibrating movements of the movable paper feed roll. The latch is positioned so as to stand in the clear when the latch bracket is swung outwardly in normal relation by a collar 224 on the stem 225 of a push button 226 pivotally connected with the latch, said push button being acted on by a spring 227 which serves to draw the collar on the stem up against a bearing 228 in which the stem is guided.

In case of an absolute failure in the caramel feed, it will be seen that both the hooks 200 will remain lodged over the elevating plunger and so with the upstroke of the plunger, these hooks will be carried upward, thereby rocking the compound lever 202—209 which draws down on the pull rod 211 to swing the latch bracket inward into position where the tooth of the latch will drop into the notch in the slide 219 on the next separating movement of the paper feed roll.

The paper feed rolls will then remain latched in this separated, non-feeding relation, either until a perfect caramel is fed or until the push button 226 is operated to unlatch the slide and permit the rolls to come together again.

If the caramel advanced over the elevating plunger is imperfect as by being under-size or lacking at one or both of its forward corners, either one or both of the detector fingers will not be operated or not be operated far enough to shift one or both the hooks from over the plunger, and consequently, the paper feed rolls will be latched in their separated relation, the same as in the case of an absolute failure in the caramel feed.

As soon, however, as a perfect caramel is fed over the plunger, both detectors will be actuated to trip the hooks and so interrupt the line of connections for latching the paper feed rolls in separated relation.

The latch can be lifted to allow the feed rolls to come together again by operating the push button 226, but unless the caramel feed has been corrected or started in the meantime, only a single wrapper length will be fed and the latch will automatically return to position holding the feed rolls in separated relation.

The push button 226 is primarily of advantage in evening up the paper when starting the machine because it enables the paper feed trip to be taken out of the control of the caramel feed. Thus in threading the machine, after paper strip down through the machine, after the end of the strip has been advanced down between the rolls, this push button may be operated to unlatch the tripped roll and permit the rolls to come together and feed down a length of paper which will be cut off by the shear at the proper point to form on the next feeding action of the rolls, a length just right for wrapping the first caramel. This enables the strip to be automatically squared up with loss of less than a wrapper length of the strip.

Rejector.

To prevent under-size or imperfect caramels from being passed on through the machine, special means are provided in the present disclosure for "rejecting" or casting out the faulty products immediately following their detection. For the purpose, a lever 229 is hung loosely from a rock shaft 230, Figures 6, 7 and 8 in position to place the lug or shoulder 231 at the lower end of the same inside the circle of revolution of the plunger stems on the transfer head and at a time when an imperfect caramel has been detected, the lever is automatically coupled to the rock shaft by the shifting of a pin 232 sliding in a transverse bearing 233 in the lever into a socket provided for the same in an arm 234 fixed on the rock shaft.

The shifting of this pin is accomplished from a bellcrank having a lower arm 235 connected with the inner end of the pin and a substantially horizontal arm 236 connected by pivoted link 237 with an arm 238 of the latch bracket 213. The bellcrank has a loose or sliding connection 239 with the end of the pin of sufficient extent to allow for the swinging movement of the lever 229 without effecting disengagement of these parts.

It will be apparent from this that upon the detection of an imperfect caramel about to be lifted by the plunger into a pocket in the transfer head, not only will the latch plate be rocked to swing the latch into position for holding off the paper feed, but the rejector lever will be coupled to its rock shaft and will thereby be swung outwardly into the position indicated in Figure 8 to thrust the transfer plunger outwardly and thereby discharge the imperfect caramel from the transfer head before it can reach the wrapping wheel.

The wrapper feed being interrupted at such a time, no wrapper will be fed to the emptied pocket in the transfer head and consequently no imperfect caramels will be wrapped in the machine. The construction thus insures that all the products of the machine will be perfect.

Caramel feed control.

In the present machine the feeding operation of the caramels is under control of a hand lever 240, Figures 8, 44 and 45, pivoted at 241, and having an extension 242 projected inward past the pivotal center connected by a cable 243 with the lower arm of a bellcrank 244, Figure 14, whose upper arm is connected by link 245 with arm 246 of a trip collar 247. This trip collar is loosely supported on the oscillating and reciprocating caramel feed shaft 7 and is positioned adjustably thereon by a fork 248 engaged with a grooved portion of the collar and carried by a rod 249 adjustably secured at 250 in a lug 251 on the frame of the machine.

The trip collar is tensioned against the pull of the cable by a spring 252, Figures 13 and 14, housed in a pivoted bearing 253 and exerting its force upwardly on a stem 254 connected with an arm 255 fixed to the shaft 256 on which the bellcrank 244 is keyed.

The spring 252 thus has a tendency to rock the bellcrank 244 in a left handed direction in Figure 14 and so to swing the trip collar right handedly in that view. The pull of the cable, however, normally overcomes this tendency so that with the hand lever 240 in the normal running position shown in full lines, Figure 44, the trip collar will be positioned as shown in Figure 14.

The trip collar 247 carries on its upper forward portion, a lug 257 for engagement by a hook 258 pivoted at 259 on top of the caramel feed sleeve 5 and on its forward face a projection 260 for engagement with a tail extension 261 of a second hook 262 pivoted at 263 on the lower side of the caramel feed sleeve and adapted for interlocking engagement with a drive collar 264 adjustably secured on the caramel feed shaft at 265.

In the normal or non-tripping position of the collar 247, Figures 14, 16 and 19, the hold-back lug 257 and the trip lug 260 are positioned clear of the hold-back latch 258 and the drive hook 262 and during such time the drive hook is held engaged with the drive shoulder 264 by a spring pressed plunger 266 seated in the caramel feed sleeve and engaged with the forward side of the tail extension 261. Under such conditions, with the feed sleeve interlocked with the drive shoulder, the caramel feed sleeve will be carried back and forth in the reciprocating movements of the feed shaft and by its keyed engagement on the shaft will be oscillated as in Figure 10 to carry the caramel feed blade 2 into and out of engagement with the caramel stop in the feed chute 1. Thus under ordinary operating conditions, the caramel feeding blade will be reciprocated and oscillated with the shaft to intermittently advance the caramel strip.

This feeding operation, however, is under the immediate control of the hand lever 240 which, when shifted to the broken line position in Figure 44, releases the cable and permits the spring 252 to then assert and rock the trip collar into the position shown in Figure 17, where upon the next retractive stroke of the feed sleeve, the trip lug 260 will engage the tail of the drive hook 262 to separate said hook from the drive shoulder and the latch 258 will snap over the latch shoulder 257 to hold back the sleeve and prevent it from following the reciprocating movements of the shaft.

The engaging portions of the hold-back latch and lug are of sufficient extent to allow for the oscillating movements of the feed sleeve without releasing these parts.

The adjustable positioning of the trip collar by means of the rod 249 and the adjustability of the drive collar 264 on the caramel feed shaft provide for desirable variations in the action of the caramel feed sleeve.

*Automatic control of caramel feed.*

In the machine of the present disclosure, the feeding of the caramels is placed under the control of the paper feed by providing a detector which operates to cause an interruption in the caramel feed when the paper breaks or the supply is exhausted. In the illustration, this detector takes the form of a paper clamp carried by a lever 267, pivoted at 268, Figures 7, 8 and 44, positioned by the paper and having a dependent finger 269 to engage over a lug 270 on one end of a lever 271 rockingly engaged on the support 241 and carrying a roll 272 at its opposite end for engagement with the lobes of a double cam 273 on the shaft 39.

In the normal running position of the machine, Figure 7 the tension of the paper on the detector paper clamp is sufficient to hold the detector lever downwardly with the dependent finger of the same standing in position over the lug 270 and thereby supporting the lever 271 with the roll clear of the cam 273. The detector lever is under tension of a spring 274, Figure 41, so that as soon as there is a break or interruption in the paper, said lever will swing upwardly, as shown in Figure 44, to carry the dependent finger clear of the lug 270 and thus drop the cam lever down into position for the roll to be engaged by cam 273. When the cam lever 271 is thus dropped down into position to be actuated by cam 273, a spring pressed latch bolt 275, slidingly mounted on the lever is thereby carried back behind the point of a spring retracted bolt 276 on the hand lever 240, which latter in this running position of the hand lever is forced outwardly to a point where it can be engaged by the cam lever bolt because of the engagement of a rearward projection 277 of the same on an inclined shoulder or cam 278 on the hand lever quadrant 279.

The cam lever thus becomes automatically coupled to the hand lever and therefore as it rises with the cam, swings the hand lever up into the broken line position indicated in Figure 44, which through its action of releasing the pull on the cable 243, causes the trip collar to operate in the manner before described to stop the caramel feed.

When the hand lever is shifted either automatically or manually up into the non-running position shown in the broken lines, the rear or outer end of the spring bolt 277 rides down the incline 278, permitting this bolt to retract clear of the cam lever bolt 275 so that the cam lever will then simply swing idly with the cam. A suitable detent 280 is shown provided on the hand lever for engagement with notches in the quadrant to hold the hand lever in either the running or inactive positions.

To facilitate the placing of the paper strip, the paper detector clamp may be constructed as shown in Figures 40 and 41 with relatively fixed and movable jaws 281 and 282, faced with felt or the like, the movable jaw being pivoted at 283 on one arm of an angle lever 284 pivoted at 285 on the detector lever 267 and engaged at the rear of its pivotal support at 286 by a toggle bolt 287 pivoted at 288 and surrounded by a spring 289 which has a bearing against the pivoted block 290 in which the end of the toggle bolt is slidingly received. A stop 291 is shown on the detector lever 267 opposite the joint in the toggle to limit the throw of the toggle to the opposite side of the toggle center at a point where the movable clamp jaw will be fully open to receive the paper. Thus, to engage the paper in the detector clamp it is simply necessary to pull outward on the movable jaw or the angle lever which carries this jaw, until the toggle snaps over into its reverse position, whereupon, the jaws will remain open until the paper is engaged therebetween and the jaw again forced back into closed relation.

Prior to the entry between the feeding rolls, the paper strip is shown as directed by a brush guide, Figures 42 and 43, comprising a bristle carrying jaw 292 pivotally supported at 293 on an extension of the relatively fixed jaw 294 and releasably held in its closed relation by a pivoted latch 295 also mounted on an extension of the fixed jaw. Thus two jaws are shown as bodily adjustable for the purpose of laterally positioning the strip by an adjusting nut 296 on a screw stem 297 having a grooved portion receiving a fork 299 on an extension 300 of the fixed jaw, the latter being slidably mounted in a suitable guide 301 and carrying side gages 302 so that upon turning the nut 296, this brush guide will be shifted as a unit and thus shift the paper to one side or the other.

*Complete operation.*

With the machine turning over idly and no caramel being fed, the caramel detectors at the end of the feed chute will have caused the paper feed rolls to be separated as in Figure 10 and with no paper in the machine the paper detector will have caused the starting handle 240 to be thrown up into the upper non-running position.

After placing a roll of paper in position and feeding the same down through the detector guide and brush guide in between the feed rolls, the pushing of the button 226 will momentarily release the paper feed rolls from the control of the caramel detectors and said rolls will then come together on the paper by action of cam lever 183 and cam 184 to advance the paper far enough to be cut by the shears at the paper point for thereafter providing the first wrapper length.

After placing a caramel strip in the feed trough, the starting lever 240 can be pulled downward to shift the trip collar 247 so as to unlatch the caramel feed sleeve 5 and permit the hook 262 to couple said sleeve with the drive shoulder 264 on the caramel feed shaft 7.

With the caramel feed in operation, the caramel strip will be advanced a step at a time beneath the vertically reciprocating rotary knives 31, Figures 6 and 9, which successively cut the strip to greater depths, severing the final lengths into caramels which are pushed on over the elevating plunger 42 and lifted up into the bite of the pockets in the intermittently rotating transfer head 48 at a time when such pockets are at rest over the plunger.

In the reverse position of the head with the caramel containing pocket at the top, a wrapper length of the paper is fed down into the then opened gripper, which closes on the wrapper as the shear operates to sever this wrapper length from the paper strip.

In its next rotary movement, the transfer head is brought up into synchronism with the continuously traveling wrapping wheel, Figures 21 and 22, and at a moment when the two are traveling in synchronism and the pocket of one is approximately opposite a pocket in the other, the plunger 49 of the transfer head is actuated by lever 81 to shift the caramel with the wrapper in front of it over into the bite of the pocket in the wrapping wheel.

In succession, the first top fold is then made by the rotating folding blade 100, Figure 23; this fold is tucked under the second top fold and the second top fold is tensioned over the edge of the second top folder plate 109, Figure 23ª; with the second top fold completed under plate 109, the reciprocating and oscillating blades 110, Figure 28, tucks in the ends of the tubed wrapper, the oscillating blades 119, Figure 31, turn in the first end fold and the relatively stationary side plates 121 turn in the second end fold over the first end fold.

As the caramels come opposite the take off wheel 124, Figures 7 and 35, the ejector lever 129 thrusts the wrapping wheel plungers outwardly to discharge the caramels into the grip of the cooperating flanges on the take off which then carries the caramels up beneath the final folding edges 131, 132, Figure 36, and over the stripper 135 from which the pusher 136 shifts the completely wrapped caramels in between the conveyer belts 137, 138.

The duplex or multiple unit machines are timed so that the wrapped caramels from the different wrapping units will be fed in between the belts of the conveyer in spaced relation to prevent interference between products of different wrappers and these caramels pass in single file, Figure 1, onto the packer at the end of the machine.

This packer operates as disclosed more particularly in the co-pending application heretofore referred to. After enough caramels have accumulated to form a box-row, it is shifted laterally to one side and then after enough rows have been shifted to form a layer, the layer is bodily shifted over the tray above the intermittently operating elevator 158 which lifts the layer and the superposed stack of layers a distance somewhat greater than the caramel height where the tray is caught and held in supported relation by hooks 159. During this forward stroke of the layer feeding carriage, hooks on said carriage engage with a tray in the stack above the bottom tray and retract the same at a point where the stack is confined in the vertical guideway 160, and this extracted tray is then carried on the return stroke of the layer feeding carriage into position over the top of the elevator ready to receive the next layer.

As the stack grows to a height greater than a box depth, a box or carton is inverted over the floating guide 165, Figures 1 and 2, and forced down over the stack until the bottom of the box reaches the top of the stack, whereupon, a separator blade is inserted between the layers at the edge of the box and the box-load removed and the box turned upright with its contents properly packed therein.

It should be noted that the caramels are shifted from the take off wheel onto the conveyer with the final folds or flaps uppermost and they remain in this relation during the subsequent layer forming and stacking operations, and go into the box with the flaps or points facing the bottom of the box so that when the box is opened by the user, the smooth sides of the caramels are upward. By this method of packing, the caramel layers present a smooth, neat appearance and the points being underneath, are prevented from spreading or opening.

As the row trip 154 of the packer will operate only when a row of caramels is completed, it will be seen that the packer will in effect, "wait" for the wrapper or wrappers in case the operation of one or more of the wrapping units is interrupted. Thus the packer for a duplex or triplex machine will keep right on operating handling the products of either one or two or all of the wrapping units. Because of this cooperative relation between packer and wrappers, the packer can be driven by flexible shafting 303, Figures 1 and 2, from the same motor 304, which drives the wrapper or wrappers.

In the event of a break in the paper feed at any one of the wrappers, the paper detector 267 at that wrapper immediately releases the cam lever 271, Figures 7, 8 and 44, permitting it to drop down into engagement with cam 273 and be actuated thereby to couple up with the hand lever 240 and throw that lever up into the caramel feed stop position, where the release of pull on cable 243 through the impulse of spring 252, Figure 14, rocks the trip collar 247 into the position shown in Figure 16 and at the left in Figure 6, to release the caramel feed sleeve from the drive collar 264 and latch the same back in inoperative position.

In somewhat similar fashion, an interruption in the caramel supply or the feeding of an imperfect caramel will result in the non-actuation of both or possibly one of the detectors 193, Figure 9, permitting both or one of the hooks 200 to remain in position over the elevating plunger 42, which thereupon through the connection thus provided will pull down on the link 211 and rock the latch plate 213 into position where the latch carried thereby will interlock with the link 219 upon the next separating movement of the paper feed rolls to retain the rolls in their separated relation.

Under either of the conditions described, that is with the machine tripped either for lack of paper or for lack of caramel, the machine can be again started in operation by simply supplying the missing element and, in the case of the caramel shortage, pulling down on the control lever 240 to rock the trip collar to release the hold-back latch and permit the hook to again engage the drive collar on the caramel feed shaft. In again starting the paper feed the automatic control is temporarily countermanded to permit the feed rolls to come together and grip the fresh length of paper by simply operating the push button 226, Figure 8, which releases the latch and permits the rolls to come together under influence of the cam lever 183. When an imperfect caramel is lifted by plunger 42 into a pocket in the transfer head, it will be almost immediately rejected and thrown out by the action of the rejector lever 229, Figure 8, which is automatically coupled to the rock arm 234 by the shifting of pin 232 from connections 235, 237, etc., to the latch supporting plate 213, which latter is the part directly actuated from the caramel detector machanism.

Another important feature of the invention is that the wrapping wheel and the packer continue in operation and finish up the caramels in process after the machine is tripped either because of a failure in the paper supply or failure in the caramel supply so that all work which has been started is completed and only the perfect products are completed and fed onto the packer. The packer thus only receives perfectly wrapped caramels and only perfect goods will be packed.

In a multiple unit wrapping machine such as illustrated, the transfer heads of the several units may all be operated from the line of shafting 53ª, Figure 46, which forms in effect a continuation of the continuously rotating main shaft, but is driven intermittently because of its being secured directly in the end of the hub 56 of the intermittently rotating ring gear 55.

What I claim is:

1. The combination with a continuously traveling wrapping conveyer, of an intermittently traveling transfer device having a movement toward the wrapping conveyer, means for feeding an article to be wrapped to said device at one of its periods of rest, means for supplying an article wrapper to said device at a subsequent period of rest and means for operating said device to bring the same into substantially synchronous travel with the wrapping conveyer and to shift the article and wrapper therefrom to the wrapping conveyer during such synchronous motion.

2. A combination as in claim 1 in which the conveyer and the transfer device approach and synchronize on circular approaching paths.

3. A combination as in claim 1 in which the transfer device is of two armed construction and arranged one arm to take an article while the other arm is taking a wrapper.

4. A combination as in claim 1 with a continuously traveling take-off for the wrapped article moving in substantial synchronism with the wrapping wheel.

5. A combination as in claim 1 in which the article feed includes a detector for imperfect or missing articles and in which the wrapper feed is under control of such detector.

6. A combination as in claim 1 with a take-off for wrapped articles cooperating with the wrapping conveyer and arranged to separate under-size from normal-size wrapped articles.

7. A combination as in claim 1, in which the wrapper feed includes a device for detecting the absence of wrapper with means governed thereby for exercising a control over the operation of the apparatus.

8. A combination as in claim 1 with means for cutting a length of material into separate articles and for supplying the same to the feed mechanism.

9. A combination as in claim 1 with caramel guiding and severing mechanism cooperating with the feed means.

10. A device as in claim 1 with a trough associated with the feed means and a gang of rotary knives of successively increasing diameter for operating on material in the trough.

11. A combination as in claim 1 with a supply chute and in which the feed means includes a feed plunger operating at the end of said supply chute.

12. In a machine of the character disclosed, a traveling conveyer having an article pocket with an ejector and a brake for said ejector having a self-centering mounting on the conveyer.

13. In apparatus of the character disclosed, a support, a plunger guided for movement on said support and an adjustably frictional control for said plunger having a self-centering mounting on the support.

14. In apparatus of the character disclosed, a support having a guide passage and a transverse seat intersecting said guide passage, a plunger operating in the guide passage and a controller having frictional engagement with the plunger and confined loosely in transversely adjustable relation within the seat aforesaid.

15. In apparatus of the character disclosed, an article carrier having a pocket with an ejecting plunger operating therein, said plunger having a stem guided in the carrier and a controller having frictional engagement with opposite sides of said stem, the carrier having a seat for said controller permitting lateral self-adjustment of the same in opposite directions.

16. In apparatus of the character disclosed, a rotary transfer device having article-receiving pockets and wrapper grippers at opposite sides of the same, article-supplying means stationed at one side of said transfer device, wrapper-supplying means located at the opposite side of said transfer device, means for intermittently imparting half-revolutionary movements to said transfer device to bring the article and wrapper-receiving means thereon successively into cooperating relation to the article and wrapper-supplying means and means for thrusting articles taken at said article supplying means out of the pockets before they reach the wrapper supplying means.

17. In apparatus of the character disclosed, a rotary transfer device having an article holder and a wrapper gripper, article-supplying means and wrapper-supplying means disposed in the path of rotary movement of said transfer device, means for intermittently rotating said transfer device to bring the article holder and wrapper gripper successively into register with the article-supplying means and wrapper-supplying means respectively and means for removing articles taken at said article supplying means from said holder before the holder reaches the wrapper supplying means.

18. A combination as in claim 17 with a continuously rotating carrier and in which the rotary movement of the transfer device after registry with the wrapper-supplying means coincides with the continuous rotary movement of the carrier.

19. A combination as in claim 17 with a continuously rotating carrier and in which the rotary movement of the transfer device after registry with the wrapper-supplying means coincides with the continuous rotary movement of the carrier, with means for operating the wrapper gripper to release the wrapper held thereby during such period of synchronous movement.

20. In combination, a rotary transfer device having an article holder and a gripper, a cam shiftable rotatably back and forth for controlling the opening and closing movements of said gripper, an article carrier, means for feeding a wrapper to the gripper, means for shifting the article and wrapper from the transfer device to the carrier and means for rotatably shifting the cam to effect opening of the gripper when in the wrapper-receiving and article-transferring positions.

21. In a machine of the character disclosed, an intermittently traveling conveyer having a wrapper gripper, means for feeding a wrapper into the bite of said gripper while the conveyer is at rest, a shiftable cam for opening and closing the gripper and means for adjusting said cam to open the gripper when it reaches the wrapper-receiving position and to close the gripper before the conveyer starts its subsequent movement.

22. The structure of claim 21 in which the conveyer has a rotary movement and in which the adjustable cam is journaled concentrically of the conveyer.

23. In an article wrapping machine, a guide chute for the material, a cutter over the guide chute for severing the material, a rotary transferring arm at the end of the guide chute, a plunger for carrying the cut portions into the grip of the transfer arm, a wrapping wheel having a movement coinciding with the movement of the transfer arm and take-off mechanism cooperating with the wrapping wheel.

24. In an article wrapping machine, a guide for the material, a rotary transfer arm, means for shifting the material from the guide to said transfer arm, a wrapping wheel in back of said transfer arm and having a movement coinciding with the travel of the transfer arm, a take-off wheel in back of said wrapping wheel, a conveyer in back of said take-off wheel and means for shifting the wrapped articles from the take-off wheel to said conveyer.

25. In a wrapping machine, a continuously rotating wrapping wheel, a transfer device at one side of said wrapping wheel having an intermittent rotary movement and a take-off device at the opposite side of the wrapping wheel having continuous rotary movement.

26. In wrapping machinery, a guide, a plunger beneath said guide, a rotary transfer arm above the guide, a wrapping wheel in rear of the transfer arm and take-off mechanism in rear of said wrapping wheel.

27. In a machine of the character disclosed, article-supplying means, wrapper-feeding means, mechanism for automatically applying the wrappers as they are fed to the article supplied, a detector for detecting the absence of wrapper material, means controlled thereby for interrupting the action of the article-supplying means, a detector for missing or imperfect articles at the article-supplying means and mechanism under control of said article detector for interrupting operation of the wrapper feed.

28. In a machine of the character disclosed, article-supplying means, wrapper-feeding means, mechanism for automatically applying the wrappers as they are fed to the articles supplied, means for detecting imperfect articles at the article-supplying means and mechanism under control of said article detector for interrupting operation of the wrapper feed.

29. In combination, article-wrapping mechanism, article-supplying means, means for feeding and severing a web of wrapper material, transfer mechanism for transferring the supplied articles and severed wrappers to the wrapping mechanism, a detector controlled by the web of wrapper material and mechanism under control of said detector for governing the operation of the machine.

30. In combination, article-wrapping mechanism, article-supplying means, means for feeding and severing a web of wrapper material, transfer mechanism for transferring the supplied article and severed wrappers to the wrapping mechanism, a detector controlled by the web of wrapper material and mechanism under control of said detector for governing the operation of the machine, including means for interrupting the operation of the article supply.

31. In combination, article-wrapping mechanism, article-supplying means, means for feeding and severing a web of wrapper material, transfer mechanism for transferring the supplied articles and severed wrappers to the wrapping mechanism, a detector controlled by the web of wrapper material, mechanism under control of said detector for governing the operation of the machine, an article detector and means controlled thereby for governing the web feed including separable web feeding rolls.

32. In combination, article-wrapping mechanism, article-supplying means, means for feeding and severing a web of wrapper material, transfer mechanism for transferring the supplied articles and severed wrappers to the wrapping mechanism, a detector controlled by the web of wrapper material, mechanism under control of said detector for governing the operation of the machine, including a control handle, means for automatically shifting the same and a latch positioned by the detector for coupling said handle to the actuating means therefor.

33. In combination, article-wrapping mechanism, article-supplying means, means for feeding and severing a web of wrapper material, transfer mechanism for transferring the supplied articles and severed wrappers to the wrapping mechanism, a detector controlled by the web of wrapper material, mechanism under control of said detector for governing the operation of the machine, including a shiftable control member and a constantly actuated shifter therefor normally held inactive with respect to said member by the detector aforesaid.

34. In combination, article-wrapping mechanism, article-supplying means, means for feeding and severing a web of wrapper material, transfer mechanism for transferring the supplied articles and severed wrappers to the wrapping mechanism, a detector controlled by the web of wrapper material, mechanism under control of said detector for governing the operation of the machine, including a shiftable control member and an oscillating actuator therefor normally held in an inoperative position with respect to said member by the detector aforesaid.

35. In combination, article-wrapping mechanism, article-supplying means, means for feeding and severing a web of wrapper material, transfer mechanism for transferring the supplied articles and severed wrappers to the wrapping mechanism, a detector controlled by the web of wrapper material, mechanism under control of said detector for governing the operation of the machine, including a control handle, an oscillating shifter therefor adapted to be positioned by the detector mechanism and cooperating latch elements on said shifter and handle respectively.

36. In combination, article-wrapping mechanism, article-supplying means, means for feeding and severing a web of wrapper material, transfer mechanism for transferring the supplied articles and severed wrappers to the wrapping mechanism, a detector controlled by the web of wrapper material, mechanism under control of said detector for governing the operation of the machine, including a control handle, an oscillating shifter therefor adapted to be positioned by the detector mechanism and cooperating latch elements on said shifter and handle respectively, the latch element on the handle being movable with relatively stationary means for positioning said element to cooperate with the other latch element only in a predetermined position of the handle.

37. In a machine of the character disclosed, the combination with web-feeding means, a detector positioned by the web, a control handle, a cam, a lever adapted to be actuated by said cam and having a part disposed to be engaged by the detector whereby said lever will be held out of operative relation to the cam and cooperating latch elements on said lever and the control handle.

38. In a machine of the character disclosed, a control handle having a shiftable latch element, a shoulder disposed to engage and position said latch element on the handle, an oscillating lever having a latch element to cooperate with said first mentioned latch element and means governed by a function of the machine for holding the oscillating lever in position with the latch element thereon inoperative with respect to the latch element on the control handle.

39. In a machine of the character disclosed, the combination with a wrapping wheel, article-feeding means and wrapper-feeding means, of a controller governing the operation of the article-feeding means, means governed by the action of the wrapper feed for automatically actuating said controller and means governed by the controller for controlling the wrapper feed.

40. The combination with wrapping mechanism, article-supplying means and web-feeding means, of a control lever carrying a shiftable latch element, a segment having a shoulder for positioning said latch element, a lever having a latch element for cooperation with the first latch element, a cam for oscillating said lever in time with the action of the wrapping mechanism and detector mechanism for holding the lever out of operative relation to the cam.

41. In a machine of the character disclosed, wrapping mechanism, article-supply means and wrapper-feeding means for furnishing articles and wrappers to the wrapping mechanism and controlling means for the machine including a cable tensioned to maintain the machine in operation and whereby upon breakage of the cable the operation of the machine will be interrupted.

42. In a machine of the character disclosed, the combination with article-feed and wrapper-feed mechanisms, of a detector for the article-feed exercising a control over the wrapper-feed and a detector for the wrapper-feed exercising a control over the article-feed.

43. In a machine of the character disclosed, the combination with article-feed and wrapper-feed mechanisms, of a control device, a connection from said control device to the article-feed and a detector for the wrapper-feed adapted to effect operation of said control device.

44. The combination with article-feed and wrapper-feed mechanisms, of a control device, a cable connection from said control device to the article-feed, a detector for the article-feed and a cable connection from said article detector to the wrapper-feed.

45. The combination with article-feed and wrapper-feed mechanisms, of a control device, a cable connection from said control device to the article-feed, a detector for the article-feed, a cable connection from said article detector to the wrapper-feed and a detector for the wrapper-feed adapted to effect automatic operation of the control device.

46. In a machine of the character disclosed, the combination with article-feed and wrapper-feed mechanisms, of an article-feed detector, a connection therefrom to the wrapper-feed arranged when tensioned to maintain the wrapper-feed operative, a wrapper detector and connections controlled thereby and including means adapted when tensioned to maintain the article-feed operative.

47. In a machine of the character disclosed, article-feeding mechanism, an article-feed detector, wrapper-feed mechanism including separable paper-feeding rolls and a controlling connection from the article-feed detector for separating said rolls for rendering the paper feeding rolls inoperative.

48. In a caramel-wrapping machine, a wrapping wheel, caramel-feeding means, a caramel-feed detector, normally cooperative separable paper-feeding rolls and a cable connection from the caramel detector for separating said rolls.

49. In a machine of the character disclosed, wrapping mechanism and take-off means including a rotating member having spaced relatively yieldable annular article-holding flanges adapted to grip the wrapped articles therebetween.

50. In a machine of the character disclosed, a wrapping wheel and a take-off wheel associated therewith provided with spaced spring tensioned flange elements for calipering the wrapped articles.

51. In a machine of the character disclosed, the combination with a wrapping wheel, of a take-off wheel associated therewith and having flanges to receive a partially folded product therebetween and final fold mechanism overstanding the spaces between said flanges for operating on the unfolded portions of the articles carried between the flanges of said take-off wheel.

52. In a machine of the character disclosed, a constantly rotating wrapping wheel and a constantly rotating take-off wheel cooperating therewith and provided with spaced article-gripping flanges for calipering the wrapped articles.

53. In a machine of the character disclosed, a constantly rotating wrapping wheel and a constantly rotating take-off wheel cooperating therewith and provided with spaced article-gripping flanges for calipering the wrapped articles, a conveyer adjacent the take-off wheel and means for ejecting wrapped articles of the proper size from the take-off wheel onto said conveyer.

54. In a machine of the character disclosed, a conveyer wheel having article-gripping flanges spaced a definite distance apart, one of said flanges consisting of spring tensioned segments.

55. In a machine of the character disclosed, a wrapping wheel, a conveyer wheel cooperating therewith and having spaced flanges to carry off between them partially wrapped articles taken from the wrapping wheel and final fold means entered between the wrapping wheel and conveyer wheel and extending between the flanges of the latter.

56. In a machine of the character disclosed, an article carrier provided with grippers, paper-feeding mechanism above said carrier for advancing a web of wrapping material downwardly into the bite of the grippers on said carrier and a web cut-off below the feed mechanism but above the carrier and including fixed and movable blades mounted in a frame bodily adjustable with respect to the carrier.

57. In a wrapping machine, an article carrier having a gripper, paper-feed rolls above said carrier for advancing a strip of wrapper material downwardly into the bite of said gripper and cut-off means interposed between said paper-feed rolls and carrier and adjustable bodily either upwardly or downwardly with respect to both rolls and carrier.

58. In a machine of the character disclosed, web-feeding means and a device positioned by said web having cooperating jaws held open or closed by a spring toggle, said jaws when closed having a sliding grip on the web and supported to be bodily shifted by the web.

59. In a machine of the character disclosed, web-feeding means and a device positioned by said web having cooperating jaws held open or closed by a spring toggle, said jaws when closed having a sliding grip on the web and supported to be bodily shifted by the web, and said support including a freely swinging pivoted arm carrying the web engaging jaws.

60. In a machine of the character disclosed, a reciprocating feed member, a latch adapted to engage the same and be shifted thereby, control means for actuation by said latch and a displaceable detector supported relatively stationary with respect to the latch and feed member, said detector having a part projecting into the path of material advanced by the feed member so as to be positioned by said material and engaging the latch for positioning the same with respect to the feed member.

61. A structure as in claim 60, in which the detector is pivotally supported and has a swinging motion between the feed member and latch.

62. A structure as in claim 60, in which the feed member is in the form of a plunger having a head cut away at opposite edges and in which the detector has fingers entering the cut away portions of said head.

63. A structure as in claim 60 in which the detector and latch parts have interlocking shoulders to retain the latch mechanism in the position to which it is shifted by the feed member.

64. A structure as in claim 60 in which the detector and latch parts have interlocking shoulders to retain the latch mechanism in the position to which it is shifted by the feed member and in which said shoulders are disengageable upon subsequent actuation of said detector.

65. In combination with an interruptable paper-feed, an article-feeding member, means for tripping the paper-feed, including a shiftable element engageable with a moving member of the article-feed and a detector cooperatively associated with said moving member and adapted to position the shiftable element with respect to said member.

66. In combination, separable paper-feed rolls, an article-feed plunger, a latch shiftable into and out of engagement with said plunger, connections from said latch to the feed rolls for effecting separation of the same and a detector associated with the plunger and adapted to position the latch with respect thereto.

67. A combination as in claim 66 in which the detector and latch have interlocking shoulders for retaining the latch in the position to which it is shifted by the plunger.

68. In a machine of the character disclosed, a feed chute, an article shifting plunger at the end of said chute, an article detector associated with said plunger and means for controlling a function of the machine, including a latch for cooperative engagement with the plunger and positioned by said detector.

69. In a machine of the character disclosed, an article detector having detector fingers in the form of loops of wire adjustably clamped in place and at opposite sides of the path of article feed of the machine in position to engage widely separated portions of the same articles.

70. In combination with a rock member, an actuating latch connected thereto and a controlling connection extending therefrom, a reciprocating member and a detector element controlling engagement or non-engagement of said latch and reciprocating member.

71. In a machine of the character disclosed, a rock member, a control cable connected therewith, a latch connected with said member, a reciprocating member and a detector controlling engagement between the latch and reciprocating member.

72. In a machine of the character disclosed, a feed chute, a transferring plunger at the end of said feed chute, a latch for engagement with said plunger, a detector positioned for actuation by an article on the plunger and arranged to control engagement between the latch and plunger and means for controlling a function of the machine having actuating connections extending to the latch.

73. In a machine of the character disclosed, feed mechanism, a cable for controlling action of the same, a pivoted lever to which said cable is connected, a rock lever pivoted concentric to said pivoted lever, means for oscillating said rock lever, said levers having shoulders engageable for imparting the movement of the rock lever to the cable lever and a shiftable element for positioning the rock lever in inoperative relation to the cable lever.

74. A structure as in claim 73 in which the shiftable positioning means comprises a freely swinging lever having web engaging jaws between which the web passes in its feeding movement.

75. A combination as in claim 73 in which the engaging shoulders comprise spring tensioned latches, one positioned by a cam shoulder.

76. In a machine of the character disclosed, an article-feed, a trip for interrupting action of the same, a cable for positioning said strip, a lever to which said cable is connected, a rock lever having a disconnectible engagement with the cable lever and a shiftable member for holding said rock lever inoperative with respect to the cable lever.

77. In a machine of the character disclosed, separable paper-feed rolls, a lever for effecting separation of the same and a connection for operating said lever shiftable to opposite sides of a center for rendering said connection effective or ineffective to shift the lever.

78. In a machine of the character disclosed, separable paper-feed rolls, a member shiftable to effect the separation of said rolls and a cable for actuating said member and connected to the member by a pivoted element shiftable to carry the cable end to opposite sides of the pivotal center.

79. In a machine of the character disclosed, means for wrapping caramels, a stacker for stacking the caramels in layers and means for delivering the wrapped caramels from the wrapper to the stacker with the points of the wrappers uppermost so that upon engagement of a box over the top of the stack and the removal of the contained caramels with such box, said caramels will be packed in the box with the points of the wrappers downward.

80. In combination, an article shifting plunger, article wrapping mechanism and a control for said mechanism operably by a hook standing normally in position for engagement by the plunger but shiftable from such position by an article on the plunger.

81. In a wrapping machine, a control device, an article shifting plunger, a hook normally positioned over said plunger but displaceable by an article on said plunger and connections from said hook to the control device.

82. In a wrapping machine, continuously rotating paper feed rolls, means for intermittently separating said rolls, a latch for holding the rolls in separated relation, an article shifting plunger, a hook positioned for engagement by said plunger and connections from said hook for rendering the latch operative.

83. In a wrapping machine, continuously rotating paper feed rolls, means for intermittently separating said rolls, a latch for holding the rolls in separated relation, an article shifting plunger, a hook positioned for engagement by said plunger, connections from said hook for rendering the latch operative and an article detector operative to shift the hook out of possible engagement by the plunger.

84. In a wrapping machine, an article shifting plunger, detector fingers positioned at the corners of said plungers, hooks normally overstanding the plunger and independently displaceable by the detector fingers, means for latching the hooks in the positions to which they may be shifted by the plunger and control mechanism operable by either of the hooks.

85. A wrapping machine having means for controlling a function of the same, operating connections for said means including a lever, hooks pivoted on said lever, an article shifting plunger positioned to actuate said hooks and independently operating article detectors for shifting the hooks clear of operative relation to the plunger.

86. A wrapping machine having means for controlling a function of the same, operating connections for said means including a lever, hooks pivoted on said lever, an article shifting plunger positioned to actuate said hooks, independently operating article detectors for shifting the hooks clear of operative relation to the plunger and latches for supporting the hooks clear of the plunger after said hooks have been actuated by the plunger.

87. A wrapping machine having means for controlling a function of the same, operating connections for said means including a lever, hooks pivoted on said lever, an article shifting plunger positioned to actuate said hooks, independently operating article detectors for shifting the hooks clear of operative relation to the plunger and latches for supporting the hooks clear of the plunger after said hooks have been actuated by the plunger, said latches being releasable by the detectors upon actuation of the latter by an article on the plunger.

88. In a wrapping machine, a transfer head having an article pocket and a wrapper gripper adjacent the same, means for intermittently rotating said transfer head, a gripper controlling cam concentrically supported with respect to the transfer head and means for automatically rocking the cam to control the operation of the gripper.

89. In a wrapping machine, an article holder provided with a wrapper gripper, means for intermittently rotating said holder, cam means for holding the gripper open to take a wrapper while the holder is in a position of rest and means for actuating the same cam means to close the gripper while the article holder is still in such a position of rest.

90. In a wrapping machine, a wrapping wheel, a transfer head provided with article pockets and wrapper grippers, means for intermittently rotating the transfer head, means for feeding articles to the pockets at one side of the transfer head during periods of rest, means for feeding wrappers to the grippers at the opposite side of the transfer head in the periods of rest and cam means for holding the grippers open and for closing the same upon the inserted wrappers in such periods of rest.

91. In a wrapping machine, means for supporting a reel of wrapper material in the upper portion of the machine, a wrapping wheel and a transfer head below the reel support, means for guiding the wrapper material downwardly to the transfer head, caramel feed mechanism below the transfer head and take-off mechanism at the rear of the wrapping wheel.

92. In a wrapping machine, a continuously rotating wrapping wheel, a continuously rotating take-off wheel at the back of said wrapping wheel, an intermittently rotating transfer head at the front of the wrapping wheel, a wrapper reel support above the wrapping wheel, means for feeding the wrapper material from said reel support to the transfer head and caramel feed mechanism below the transfer head.

93. In a wrapping machine, a continuously rotating wrapping wheel, a continuously rotating take-off wheel at the back of said wrapping wheel, an intermittently rotating transfer head at the front of the wrapping wheel, a wrapper reel support above the wrapping wheel, means for feeding the wrapper material from said reel support to the transfer head, caramel feed mechanism below the transfer head and a carry-off conveyer at the rear take-off wheel.

94. In a wrapping machine, a wrapping wheel, a rotating folder blade adjacent the periphery of said wheel and a follow-up brush behind said folder blade.

95. In a wrapping machine, an article carrier, a folding blade having a movement coinciding with the movement of the carrier and a brush-like follower for said folding blade.

96. In a wrapping machine, a continuously rotating wrapping wheel, a continuously rotating shaft adjacent the periphery of the wheel, a folder blade mounted on said shaft and a fold engaging presser mounted on the shaft behind said folding blade.

97. In a wrapping machine, an article carrier, a pivoted spring tension folding blade having a path of movement coincident with the travel of the carrier and a fold engaging brush mounted behind said folding blade and traveling therewith.

98. In a wrapping machine, an article carrier, a relatively stationary folding plate at the periphery thereof and a presser traveling in the same direction with the carrier and traversing the outer surface of the folding plate to tension a wrapper fold thereover.

99. In a wrapping machine, an article carrier, a relatively stationary folding plate cooperating therewith, a relatively movable folder blade and a follower traveling therewith for cooperation with the relatively stationary folding plate.

100. In a wrapping machine, a traveling carrier, a first top folder cooperating therewith, a second top folder in cooperative relation to the carrier and a second top fold tensioning member carried by the first top folder and cooperating with the second top folder.

101. In combination, a wrapping wheel, a second top folder plate at the rim of said wheel, a rotating first top folder blade adjacent the rim of the wheel and a brush positioned behind the first top folder blade arranged to lay the first top fold and to tension the second top fold over the point of the second top fold plate.

102. In combination with a plurality of independently operating wrapping units, a packer receiving the articles from all of said wrapping units and controlled in its action by the measure of articles received whereby said packer will "wait" for its full quota of articles when less than all the wrapping units are in operation.

103. In combination with a plurality of independently operating wrapping units, each having automatic control means for interrupting action of the same in the absence of articles or wrapper material, a packer receiving the wrapped articles from all such wrapping units and controlled in its action by the reception of a predetermined quota of articles and thereby arranged to adapt itself to a supply of articles from all or less than all the wrapping units.

104. In combination with a plurality of independently operating wrapping units, each having automatic control means for interrupting action of the same in the absence of wrapper material, a packer receiving the wrapped articles from all such wrapping units and controlled in its action by the reception of a predetermined quota of articles and thereby arranged to adapt itself to a supply of articles from all or less than all the wrapping units.

105. In combination with a plurality of independently operating wrapping units, each having automatic control means for interrupting action of the same in the absence of articles, a packer receiving the wrapped articles from all such wrapping units and controlled in its action by the reception of a predetermined quota of articles and thereby arranged to adapt itself to a supply of articles from all or less than all the wrapping units.

106. In combination with a packer controlled by an accumulation of a predetermined length of wrapped articles, a plurality of wrapping units each automatically controlled to deliver to the packer only perfect wrapped products whereby said packer will receive only perfect products and will wait for its predetermined quota when less than the total number of wrapping units are in operation.

107. In a wrapping machine, wrapping mechanism, article feed means and wrapper feed means for delivering articles and wrapper material to the wrapping mechanism, a manual control for the article feed means and a detector controlled by the presence or absence of wrapper material in the wrapper feed means for automatically governing operation of the article feed independent of manual operation of the control.

108. In combination, a wrapping wheel, paper feed rolls and article feed means for delivering paper and articles to the wrapping wheel, means for manually controlling operation of the article feed means and a paper detector for effecting automatic operation of the manual control.

109. In a wrapping machine, a wrapping wheel, an article feed, a hand lever for turning said article feed into and out of operation, a wrapper feed and means controlled by the absence of wrapper material in the wrapper feed for effecting automatic shifting of said hand lever.

110. In a wrapping machine, wrapping mechanism, means for feeding articles to be wrapped thereto, a member for controlling operation of said article feed means, mechanical means for actuating said member and means for automatically coupling said mechanical actuating means to the control member.

111. In a wrapping machine, wrapping mechanism, means for feeding articles to be wrapped thereto, a member for controlling operation of said article feed means, mechanical means for actuating said member, means for automatically coupling said mechanical actuating means to the control member and means for automatically uncoupling the control member from the mechanical actuating means when actuated by the latter.

112. In a wrapping machine, wrapping mechanism, means for feeding articles to be wrapped thereto, a member for controlling operation of said article feed means, mechanical means for actuating said member, means for automatically coupling said mechanical actuating means to the control member and coupling means operative to supply a drive connection from the actuating means to the control member only when the control member is in the "running" position.

113. In a wrapping machine, a member for controlling a function of the machine, mechanical means for actuating said member and automatic means for initiating actuation of the control member by said mechanical means.

114. In a machine of the character disclosed, a control lever carrying a latch, a segment having a cam portion for positioning said latch, a mechanically actuated member having a latch for cooperative engagement with the latch on the control lever and means for governing the operation of the mechanically actuated member.

115. In a machine of the character disclosed, a control lever provided with a latch, a cam element for positioning said latch, a cam lever having a latch for cooperative engagement with the latch on the control lever and means for governing operation of said cam actuated lever.

116. In a machine of the character disclosed, a control lever carrying a latch, a cam element for positioning said latch, a rotating cam, a lever adapted to be actuated thereby and carrying a latch for engagement with the latch on the control lever and means for supporting said cam lever normally free of the cam.

117. In a machine of the character disclosed, a control lever carrying a latch, a cam element for positioning said latch, a rotating cam, a lever adapted to be actuated thereby and carrying a latch for engagement with the latch on the control lever and means for supporting said cam lever normally free of the cam, including a detector controlled by presence of material operated on in the machine.

118. In a wrapping machine, wrapper feed rolls, means for intermittently separating said rolls to interrupt the wrapper feed, an article feed, an article detector associated therewith, means for automatically latching the wrapper feed rolls in separated relation and connections from the article detector for rendering said latching means operative.

119. In a wrapping machine, wrapper feed rolls, means for intermittently separating said rolls to interrupt the wrapper feed, an article feed, an article detector associated therewith, means for automatically latching the wrapper feed rolls in separated relation, connections from the article detector for rendering said latching means operative and manually operable means for releasing the latch to permit feeding of the wrapper material irrespective of the detector control.

120. In a wrapping machine, wrapper feed rolls, means for automatically separating and approaching the rolls, a latch bar reciprocating in accordance with the separating movement of said rolls, a latch for engagement with said bar to hold the rolls in separated relation, means for supporting said latch normally clear of the latch bar and means for shifting said support to bring the latch into position for holding engagement with the latch bar.

121. In a wrapping machine, wrapper feed rolls, means for automatically separating and approaching the rolls, a latch bar reciprocating in accordance with the separating movement of said rolls, a latch for engagement with said bar to hold the rolls in separated relation, means for supporting said latch normally clear of the latch bar, means for shifting said support to bring the latch into position for holding engagement with the latch bar and means on said support for releasing the latch from such holding engagement.

122. In combination with a wrapping wheel, a take-off wheel positioned to receive products from the wrapping wheel, a conveyer and a lifting and lowering reciprocating pusher for shifting the articles from the take-off wheel to said conveyer.

123. In a wrapping machine, a wrapper detector including clamp jaws for engagement with the wrapping material, one of said jaws being hingedly supported and yieldingly held by a spring toggle in either open or closed relation.

124. In a wrapping machine, a wrapping wheel, a transfer head for delivering articles and wrappers to the wrapping wheel, means for detecting imperfect articles taken by the transfer head and rejector mechanism for discharging said imperfect articles from the transfer head to prevent delivery of the same to the wrapping wheel.

125. In a wrapping machine, a traveling article holder, a lever for discharging articles from said holder, a swinging arm carrying a pin shiftable into engagement with the lever, an article detector means for shifting said pin to thereby couple the swinging arm to the lever.

126. In a wrapping machine, a wrapper cutter, a wrapper gripper, a gripper closing cam, a reciprocating shaft and connections from said shaft for operating the cutter and the gripper closing cam to sever the wrapper and cause the gripper to immediately close on the severed wrapper.

127. In a wrapping machine, a wrapper folder comprising a bracket, a folder blade mounted in said bracket, a brush adjustably mounted in the bracket in rear of the folder blade, and means for rotating said bracket to cause the brush to follow up the folding action of the blade.

128. In apparatus of the character disclosed, a support having a guide passage and a transverse seat intersecting said guide passage, a plunger operating in said guide passage and a controller freely shiftable in the transverse seat, said controller having relatively movable heads guided toward each other and having a passage between them for the plunger, said heads being freely guided in the transverse seats and spring means for holding said heads yieldingly gripped with the plunger.

In witness whereof, I have hereunto set my hand this 17th day of April, 1924.

ARCHIBALD E. HOPKINS.